(12) United States Patent
Krywitsky

(10) Patent No.: US 7,533,694 B2
(45) Date of Patent: May 19, 2009

(54) DRY BREAK VALVE ASSEMBLY

(75) Inventor: Lee A. Krywitsky, Calgary (CA)

(73) Assignee: Hiltap Fittings, Ltd., Calgary, Alberta (CA)

( * ) Notice: Subject to any disclaimer, the term of this patent is extended or adjusted under 35 U.S.C. 154(b) by 0 days.

(21) Appl. No.: 11/465,384

(22) Filed: Aug. 17, 2006

(65) Prior Publication Data

US 2006/0289062 A1  Dec. 28, 2006

Related U.S. Application Data

(60) Division of application No. 10/164,945, filed on Jun. 7, 2002, now Pat. No. 7,152,630, which is a continuation-in-part of application No. 09/628,075, filed on Jul. 28, 2000, now Pat. No. 6,672,327.

(51) Int. Cl.
  *F16L 37/36* (2006.01)
(52) U.S. Cl. .............. 137/614.06; 251/89.5; 251/149.9
(58) Field of Classification Search ............ 137/614.06; 251/89.5, 149.9; 285/361
  See application file for complete search history.

(56) References Cited

U.S. PATENT DOCUMENTS

| | | | |
|---|---|---|---|
| 179,947 A | 7/1876 | O'Neil | |
| 923,545 A | 6/1909 | Madison | |
| 1,021,203 A | 3/1912 | Matchette | |
| 2,333,496 A | 11/1943 | Townhill et al. | |
| 2,340,965 A | 2/1944 | Kiesel | |
| 2,543,590 A * | 2/1951 | Swank | 137/614.06 |
| 2,571,236 A | 10/1951 | Hamilton | |
| 2,679,407 A | 5/1954 | Badger | |
| 2,707,390 A | 5/1955 | Beretish | |
| 2,737,401 A * | 3/1956 | Lindsay | 137/614.06 |
| 3,454,024 A | 7/1969 | McCullough | |
| 3,474,827 A * | 10/1969 | Rosell | 137/614.06 |
| 3,542,047 A | 11/1970 | Nelson | |
| 3,664,634 A | 5/1972 | Guertin et al. | |
| 3,821,970 A | 7/1974 | Affa | |
| 3,949,787 A | 4/1976 | Milo | |
| 4,010,633 A | 3/1977 | Hasha | |
| 4,019,371 A | 4/1977 | Chaplin et al. | |
| 4,133,347 A | 1/1979 | Mercer | |
| 4,184,516 A | 1/1980 | Oesterritter et al. | |
| 4,269,230 A | 5/1981 | Pepper | |
| 4,271,865 A | 6/1981 | Galloway et al. | |

(Continued)

OTHER PUBLICATIONS

OEM Mass Flowmeters, TSI Incorporated, 1998.

(Continued)

*Primary Examiner*—John Rivell
(74) *Attorney, Agent, or Firm*—Workman Nydegger

(57) ABSTRACT

A fluid system component is provided that includes first and second elements configured to be removably engaged with each other and defining a fluid passageway when engaged. The first element defines three grooves, each of which includes a terminal portion. Correspondingly, the second element includes three engagement members each of which is configured and arranged to be received in, and travel along, a corresponding groove. The presence of a predetermined line pressure in the fluid passageway forces each engagement member into the terminal portion of the corresponding groove, so as to substantially foreclose disengagement of the first and second elements until the fluid pressure in the fluid passageway has reached a predetermined magnitude.

16 Claims, 17 Drawing Sheets

U.S. PATENT DOCUMENTS

| | | |
|---|---|---|
| 4,510,969 A | 4/1985 | Rodth |
| 4,567,924 A | 2/1986 | Brown |
| 4,614,201 A | 9/1986 | King et al. |
| 4,625,746 A | 12/1986 | Calvin et al. |
| 4,646,773 A | 3/1987 | Klop et al. |
| 4,827,960 A | 5/1989 | Nitzberg et al. |
| 4,901,751 A | 2/1990 | Story et al. |
| 4,909,280 A | 3/1990 | Friedrich et al. |
| 4,909,545 A * | 3/1990 | Hohol ........................ 285/361 |
| 4,926,680 A | 5/1990 | Hasha et al. |
| 5,170,659 A | 12/1992 | Kemp |
| 5,209,105 A | 5/1993 | Hasha et al. |
| 5,297,574 A | 3/1994 | Healy |
| 5,316,033 A | 5/1994 | Schumacher et al. |
| 5,404,909 A | 4/1995 | Hanson |
| 5,529,085 A | 6/1996 | Richards et al. |
| 5,699,822 A | 12/1997 | Bodhaine |
| 5,704,659 A | 1/1998 | Lunder |
| 5,826,610 A | 10/1998 | Bodhaine |
| 5,934,319 A | 8/1999 | Schumacher |
| 6,000,278 A | 12/1999 | Hystad |
| 6,082,392 A | 7/2000 | Watkins |
| 6,142,194 A | 11/2000 | McClaran |
| 6,155,294 A | 12/2000 | Cornford et al. |
| 6,511,103 B1 | 1/2003 | Defontaine |

OTHER PUBLICATIONS

SIMA FC2 Induction-based flow meter, www.simaservis.cz , publication date unknown.

* cited by examiner

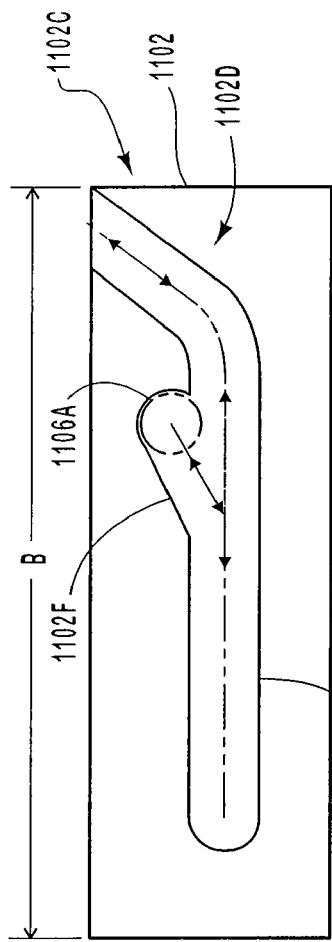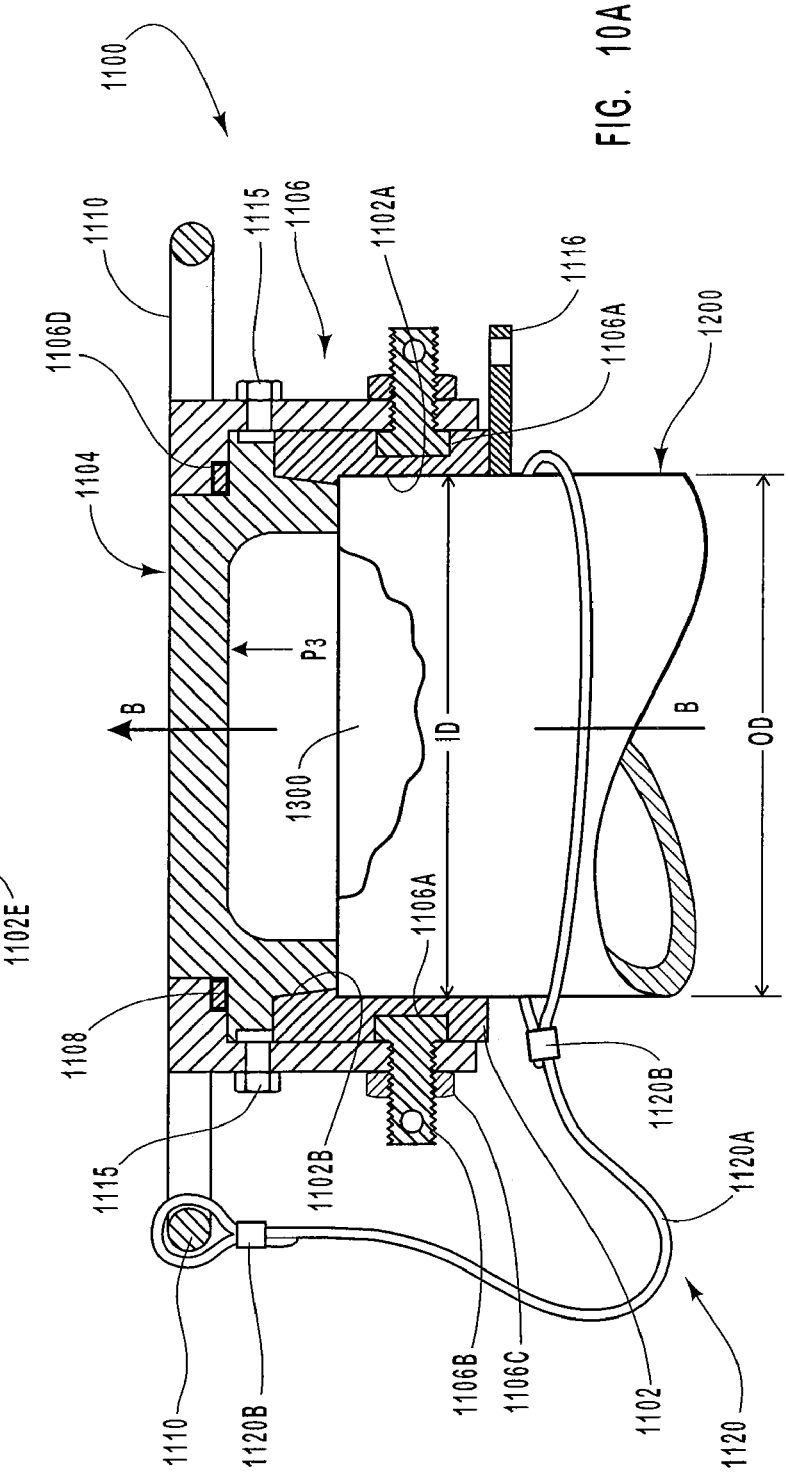
FIG. 10B
FIG. 10A

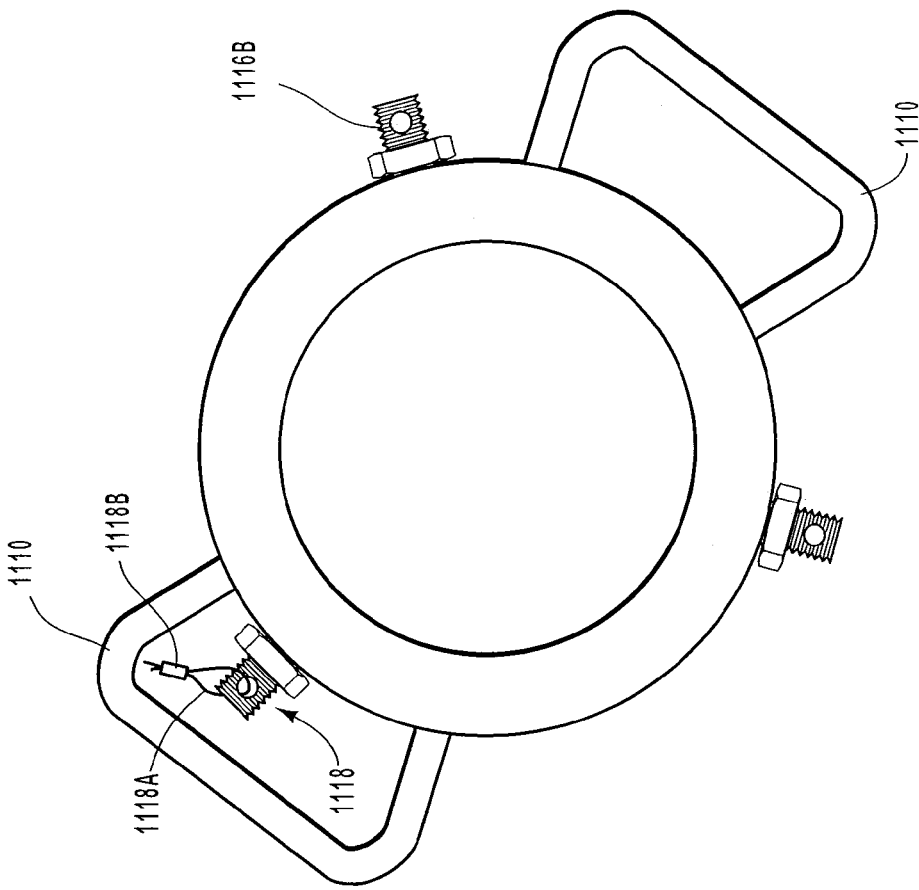
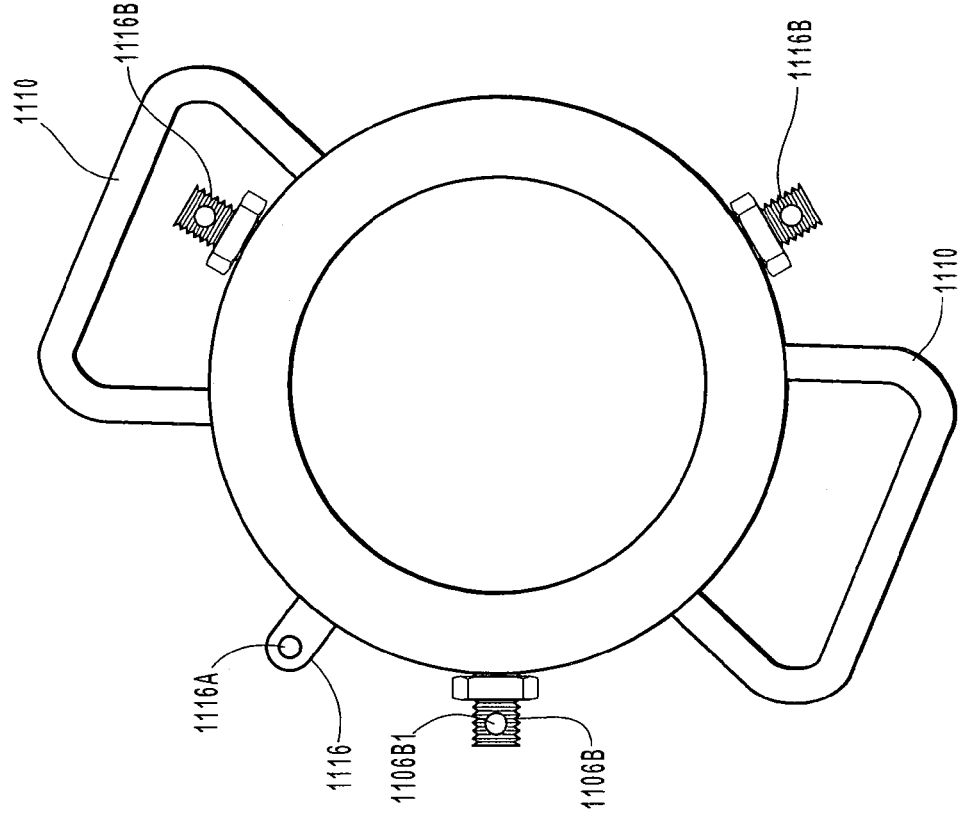

DRY BREAK VALVE ASSEMBLY

CROSS-REFERENCE TO RELATED APPLICATIONS

This application is a divisional of U.S. patent application Ser. No. 10/164,945, filed Jun. 7, 2002, now U.S. Pat. No. 7,152,630 entitled FLUID SYSTEM COUPLING, which is a continuation-in-part of U.S. patent application Ser. No. 09/628,075, now U.S. Pat. No. 6,672,327, entitled DRY BREAK VALVE ASSEMBLY, filed Jul. 28, 2000, each of which are incorporated herein in their entirety by this reference.

BACKGROUND

1. Technological Field

The present invention relates generally to fluid system components. More particularly, embodiments of the present invention relate to a fluid system component configured to utilize the line pressure of the fluid system, wherein the fluid system component is employed, in a way that substantially prevents takedown of the fluid system component until the fluid system line pressure, or relative pressure differential, changes to a safe level.

2. Related Technology

In recent years, environmental concerns have been receiving significantly more attention, and various governmental agencies have responded by implementing stringent regulations to reduce or prevent pollution. Many of these regulations and concerns are directed towards those industries that transport fluids. For example, it is very difficult to transport a fluid without spilling or leaking some of the fluid into the environment. Thus, some environmental regulations require that minimal leaking occur during handling, processing, or transportation of the fluid.

These environmental concerns become especially clear when considering the magnitude of the industries that handle hazardous fluids that, if allowed to escape even in relatively small quantities, can cause significant damage. There is a concern, therefore, to protect both the public and the environment from these types of fluids. While some fluids that are transported, such as water and milk, may not pollute the environment when they are leaked or spilled, the loss of fluid into the environment is nevertheless viewed as a general waste of resources. More generally, the loss of fluid into the environment is not desirable even if the fluid does not contribute to pollution.

Within the transportation industry, a variety of different devices are used to transport a fluid from a source to a destination. These devices often use valve assemblies and conduits of various types to both connect the source to the destination as well as to manage fluid flow through the conduit. Typically, the conduit is pressurized to direct fluid toward the desired destination. With each transfer of fluid, there is a risk that leakage will occur due to human error, equipment malfunctions, or the like.

A common source of fluid leaks and fluid spills are the valves and other components and devices employed in fluid systems. By way of example, some valves may have leaks that permit flow through the valve even when the valve is secured in the closed position. In other instances, one or more joints defined by constituent elements of the valve, such as in the case of valves designed to be taken down in two or more pieces, and/or one or more joints at least partially defined by the valve, such as a valve-to-flange connection, may be defective, resulting in leakage of some or all of the system fluid. Unfortunately, problems such as these often do not manifest themselves until after flow has been established through the valve, component, or device.

Thus, in many instances, the system operator is limited in terms of the affirmative steps that can be taken to prevent a spill that may result from one or more defective joints, and oftentimes can only correct the spill when it occurs. This is true in the case of joints that are defectively assembled, or are otherwise defective upon assembly, as well as in the case of joints that become defective over a period of time due to operating, or other, conditions.

Other problems exist as well. For example, various types of valves have been designed to stop, or "check," fluid flow through the valve when the valve is taken down into two or more constituent parts or assemblies. One known device for checking fluid flow is a ball check valve. A ball check valve is essentially a ball which rests against a ball seat to form a valve. An operator may use the ball check valve to initiate or terminate the fluid flow. Despite the check feature of the ball check valve, a problem exists in the integrity of the fluid transfer system when the valve or conduit undergoes stress.

When the conduit and the valve are subjected to forces such as stretching, pulling, twisting, and the like, the fluid being transferred through the conduit and the valve may leak or spill into the environment. More particularly, the conduit, rather than the ball check valve, is likely to rupture or otherwise malfunction in the presence of these forces. Thus, while the ball check valve is appropriate for checking fluid flow, it does not prevent spillage or leakage when subjected to external stress. Because the conduit is likely to rupture, or otherwise malfunction, in these types of situations, the spillage or leakage of fluid into the environment can be significant because the fluid flow can no longer be checked.

For example, when a fuel transport vehicle is delivering liquid through a hose into a fuel tank, one end of the hose is attached to the fuel transport vehicle, and the other end of the hose is attached to a fuel tank. A valve such as a ball check valve may be disposed at the vehicle end of the hose such that fluid communication through the hose may be established or checked.

In the event the fuel transport vehicle drives away with the hose still connected, the connection will likely break or rupture. Because the hose is typically the weakest part of the connection, the break usually occurs somewhere in the hose and fluid escapes into the environment. In this example, the ball check valve typically does not disassemble because it is much stronger than the hose. Even if the ball check valve were to break instead of the hose, fluid would still leak from the system. Such problems are particularly acute in the context of automated environments and operations where few, or no, humans may be present, and a leak may go unnoticed for a relatively long period of time.

Another concern relates to the coupling and uncoupling of caps, valves, and other fluid system components, that are employed, for example, in fuel, chemical, sewage, or other fluid transfer or processing systems. In particular, typical quick coupling devices are configured so that an operator can uncouple the mating halves of the quick coupling device, even in the presence of line pressure. Such an arrangement is problematic for a variety of reasons.

By way of example, in the event the line wherein the quick coupling device is located is charged with hazardous materials such as chemicals, sewage, fuels, or gases such as chlorine and methane, the operator performing the uncoupling operation could be seriously injured or killed when such materials escape from the line. Moreover, such hazardous materials are pollutants and significant time and cost is often involved in the cleanup of such materials.

A related problem with typical quick coupling devices concerns the pressure exerted by the material in the line wherein the quick coupling device is located. In particular, such pressure may cause the halves of the quick coupling device to rapidly come apart in an uncontrolled and dangerous manner, thereby injuring the operator and/or damaging nearby equipment. The forces resulting from such pressure can often be significant, even where the line pressure is relatively low. Thus, in a six inch diameter (nominal) pipe for example, even a relatively low pressure of 10 lbs./in.$^2$ ("psi") would exert a force of about one thousand (1000) pounds on a pipe cap attached to the end of the pipe.

Not only are such pressures dangerous, but operators may not have any way to verify, in advance of performing the uncoupling operation, whether or not the line is pressurized. Further, even if an operator is aware that pressure is present, the operator may, through inattentiveness, negligence, or for other reasons, nevertheless attempt to uncouple the quick coupling device.

In view of the foregoing, what is needed is a fluid system component having features directed to addressing the foregoing exemplary considerations, as well as other considerations not disclosed herein. More particularly, an exemplary fluid system component includes features directed to facilitating the secure engagement, and ready disengagement, of the mating halves of the fluid system component, while at the same time preventing intentional or accidental disengagement of the mating halves when a predetermined pressure is present in the line.

BRIEF SUMMARY OF AN EXEMPLARY EMBODIMENT OF THE INVENTION

In general, embodiments of the invention are concerned with a fluid system component that, among other things, facilitates the secure engagement, and ready disengagement, of mating halves of the fluid system component, while at the same time preventing intentional or accidental disengagement of the mating halves when a predetermined pressure is present in the line.

In one exemplary embodiment of the invention, a fluid system component is provided that includes mating male and female halves. The male half of the fluid system component includes a wall having an outer surface wherein a plurality of grooves are defined. The grooves are generally configured so that each of a plurality of rollers present on the outer surface of a wall of the female half of the fluid system component enters, and travels along, a corresponding groove as the male and female halves are rotatably engaged together.

Further, the grooves defined in the male half of the fluid system component are configured to define an angle with respect to the longitudinal axis of the fluid system component, so that the male and female halves advance toward each other as they are rotatably engaged. Each of the grooves also includes a terminal segment that is connected with, but offset from, the intermediate and entry segments of the groove.

In operation, the male and female portions are brought together until each roller of the female portion has engaged a corresponding groove of the male portion. The two halves are then rotated in opposite directions, causing the rollers to advance along their corresponding grooves and thereby move the male and female halves toward each other. The two halves continue to rotate until each roller enters the terminal segment of its corresponding groove, at which point engagement is completed. Thus engaged, the male and female halves cooperate to define a fluid passageway.

The introduction of a pressurized fluid into the fluid passageway acts on the fluid system component in such a way that a force is exerted that resists movement of the rollers out of the terminal segment and back into the intermediate or entry segments of the groove. Thus, the groove geometry affords the fluid system component the capability to use the line pressure in such a way as to prevent disengagement of the fluid system component halves until the line is suitably depressurized.

These and other aspects of embodiments of the present invention will become more fully apparent from the following description and appended claims.

BRIEF DESCRIPTION OF THE DRAWINGS

A more particular description of various aspects of the embodiments of the invention illustrated in the appended drawings will now be rendered. Understanding that such drawings depict only exemplary embodiments of the invention, and are not therefore to be considered limiting of the scope of the invention in any way, various features of such exemplary embodiments will be described and explained with additional specificity and detail through the use of the accompanying drawings in which:

FIG. 10A is a section view taken from the top view of FIG. 10;

FIG. 10B is a side view illustrating aspects of an exemplary groove arrangement for the cap assembly;

DETAILED DESCRIPTION OF VARIOUS EMBODIMENTS OF THE INVENTION

Reference will now be made to figures wherein like structures will be provided with like reference designations. It is to be understood that the drawings are diagrammatic and schematic representations of various embodiments of the invention, and are not to be construed as limiting the present invention, nor are the drawings necessarily drawn to scale.

Figure 1:
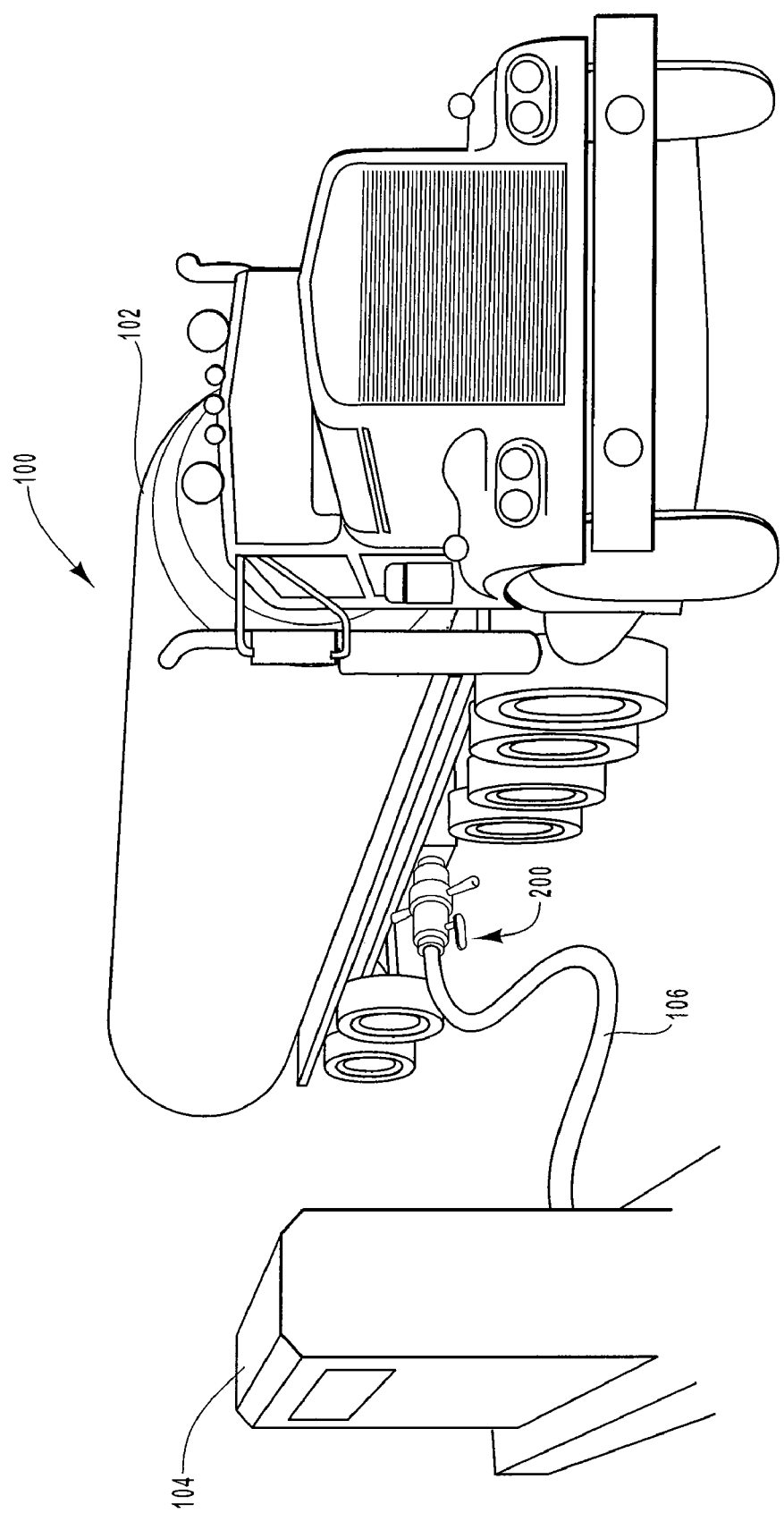
FIG. 1 depicts an exemplary operating environment for at least some embodiments of the present invention.

With reference first to FIG. 1, one embodiment of a fluid transfer system is indicated generally at 100. Note that, as contemplated herein, "fluid" includes liquids, gases, liquid-gas combinations, slurries, liquid-solid combinations, gas-solid combinations, and liquid-solid-gas combinations. In the exemplary embodiment depicted in FIG. 1, fluid transfer system 100 includes a fluid source 102 configured for fluid communication with a dry break valve assembly 200. Dry break valve assembly 200, in turn, is configured for selective fluid communication with a fluid destination 104, by way of a fluid conduit 106.

As discussed elsewhere herein, it will be appreciated that dry break valve assembly 200 may be located, in its entirety, at fluid source 102, or alternatively at fluid destination 104. In one embodiment, discussed in detail below, dry break valve assembly 200 comprises at least two discrete portions, one of which may be located at fluid source 102, and the other of which may be located at fluid conduit 106, or vice versa in a fluid loading situation.

As contemplated herein, the term "conduit" is meant to include any structure or device adapted to facilitate transportation of a fluid, wherein such structures and devices include, but are not limited to, pipes, hoses, tubes, or the like. Fluid conduit 106 may be constructed of a variety of materials, or combinations thereof, including, but not limited to, metal, plastic, rubber, and the like.

With continuing reference to FIG. 1, the fluid source 102 is illustrated as a fluid transport vehicle, and the fluid destination 104 is illustrated as an underground tank. However it will be appreciated that fluid source 102 and/or fluid destination 104, may comprise any of a variety of different static or mobile structures and vehicles. Such structures and vehicles include, but are not limited to, air, water, or land vehicles, such as, but not limited to, trucks, boats, automobiles, motorcycles, ships, railcars, aircraft, and the like, as well as structures such as tanks, reservoirs, and the like.

In operation, a pressure differential is established between fluid source 102 and fluid destination 104 so as to cause flow of the fluid through fluid conduit 106 in the desired direction. It will be appreciated that the pressure differential may be established in such a way as to cause flow to proceed in the opposite direction as well. The pressure differential may result from the force of gravity, or may alternatively be established by various types of equipment and devices including, but not limited to, pumps and the like.

In general, dry break valve assembly 200 facilitates management and control of fluid flow between fluid source 102 and fluid destination 104. In particular, valve assembly 200 allows for selective establishment and termination of fluid communication between fluid source 102 and fluid destination 104. Additionally, dry break valve assembly 200 facilitates releasable engagement of two different fluid system components, for example, fluid conduit 106 and fluid source 102. Finally, dry break valve assembly 200 includes various features which substantially prevent fluid leakage should the discrete portions of dry break valve assembly 200 be separated for any reason.

Figure 2:
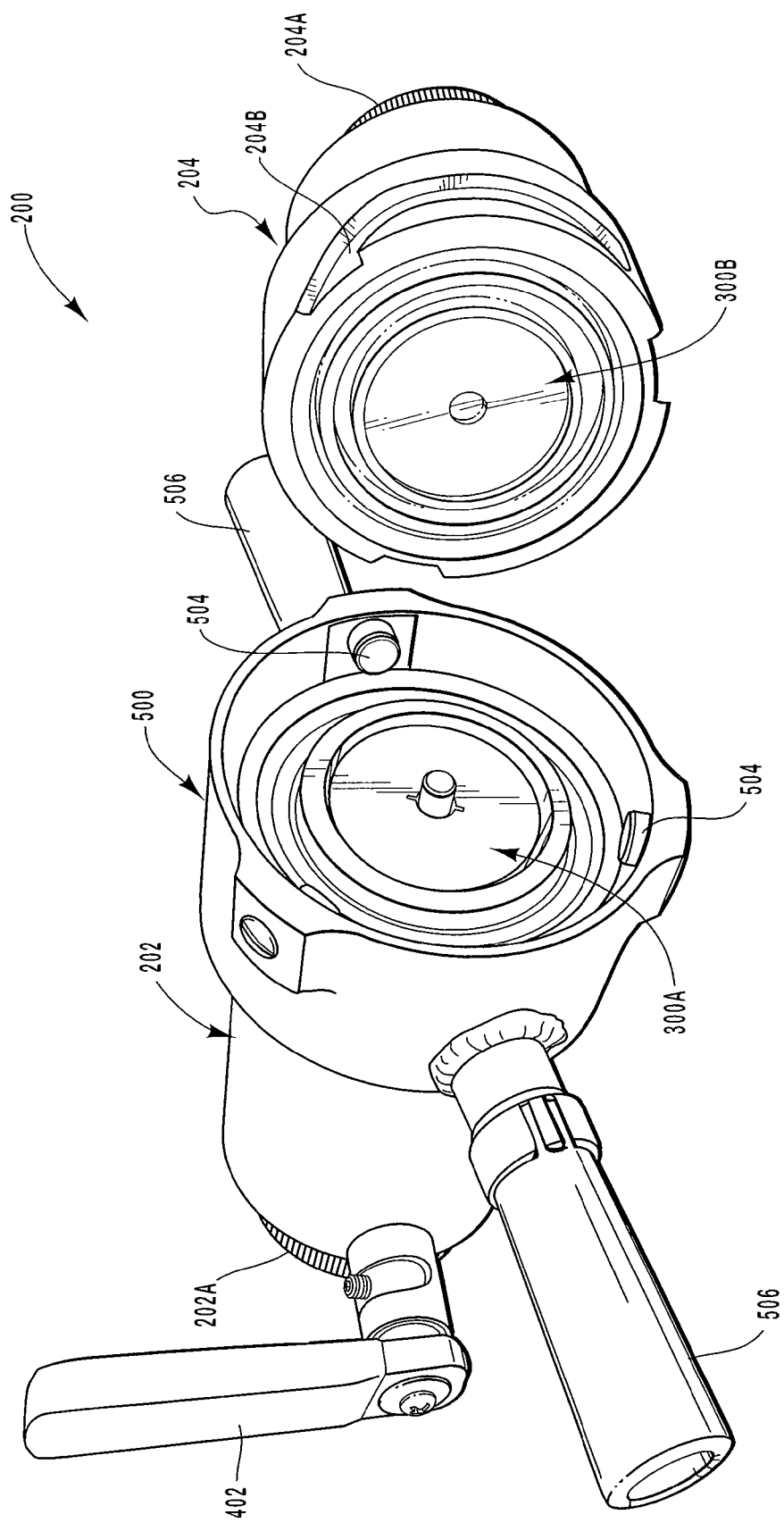
FIG. 2 is a perspective view of an embodiment of the dry break valve assembly which includes a source housing and a destination housing that can be releasably connected to each other using a sleeve.

With reference now to FIG. 2, dry break valve assembly 200 includes a first housing portion 202 and second housing portion 204. As used herein, the portion of the valve assembly closest to the fluid source is referred to as the source housing while the other housing portion is referred to as the destination portion. Either portion of the dry break valve assembly can be the source housing or the destination housing. Coupling 500 serves to removably secure first housing portion 202 and second housing portion 204 in a substantially leak-proof engagement.

Substantially disposed within first housing portion 202 and second housing portion 204, respectively, are flow control assemblies 300A and 300B. In general, flow control assemblies 300A and 300B facilitate management of fluid flow through conduits, or the like, connected to first housing portion 202 and second housing portion 204, respectively. Also disposed within first housing portion 202, and discussed in greater detail below, is an actuating mechanism (not shown in FIG. 2), which serves to manipulate the position of flow control assemblies 300A and 300B in response to input provided by way of actuating lever 402. Thus, the position of the flow control assemblies 300A and 300B may vary between fully open and fully closed.

First housing portion 202 includes a conduit connector 202A. Conduit connector 202A is configured to attach to fluid conduit 106 (shown in FIG. 1), wherein such attachment may be accomplished in a variety of ways including, but not limited to, welding, brazing, soldering, and the like. Alternatively, conduit connector 202A may comprise a compression fitting, threaded fitting, or the like for attaching to fluid conduit 106.

In similar fashion, second housing portion 204 has a conduit connector 204A. Conduit connector 204A is configured to attach to fluid conduit 106, wherein such attachment may be accomplished in a variety of ways including, but not limited to, welding, brazing, soldering, and the like. Alternatively, conduit connector 204A may comprise a compression fitting, threaded fitting, or the like for attaching to fluid conduit 106. It will be appreciated that conduit connector 202A and/or conduit connector 204A may, alternatively, be connected directly to fluid source 102 or fluid destination 106.

Figure 3:
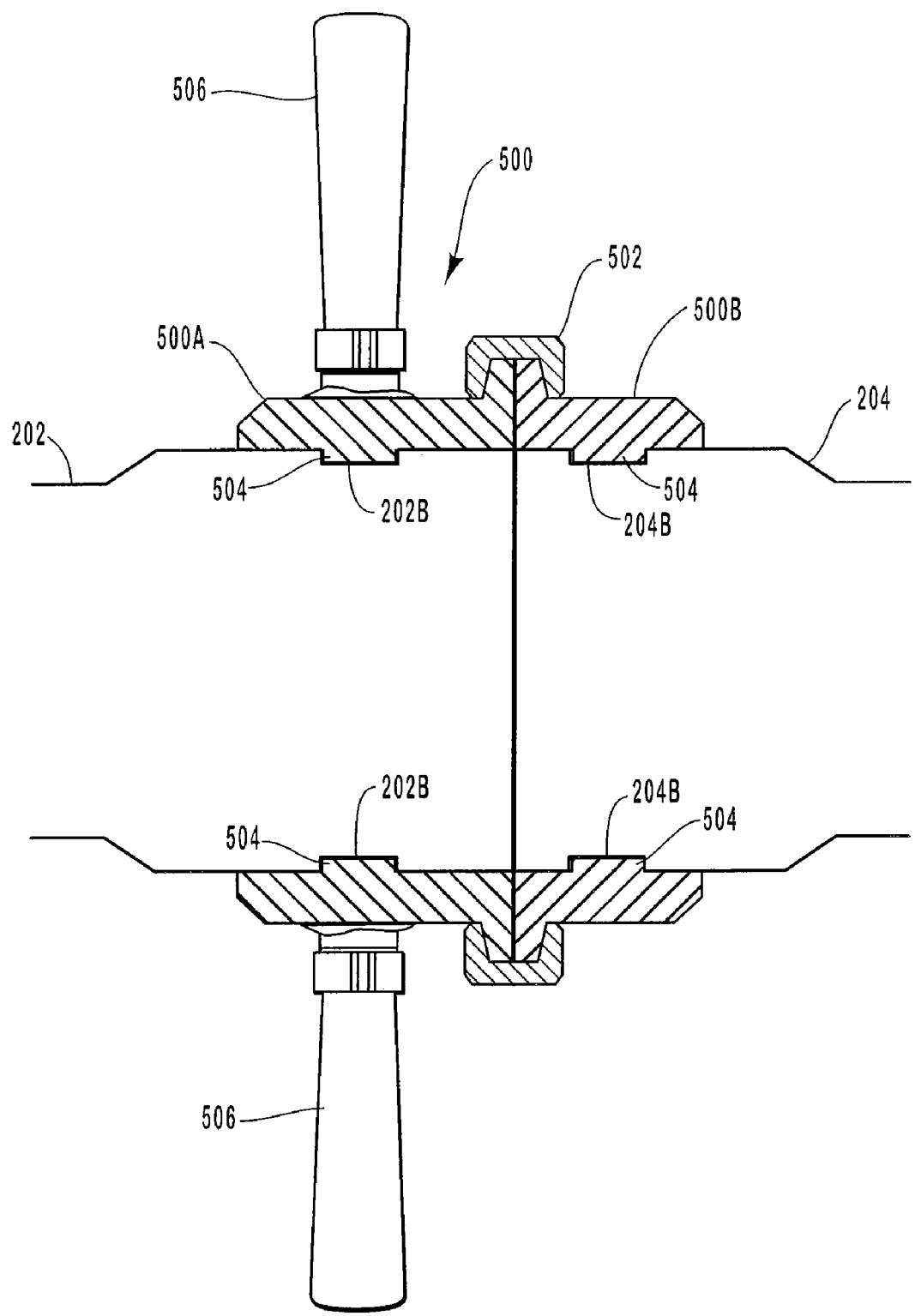
FIG. 3 depicts an embodiment of a sleeve which releasably seals and connects a source housing with a destination housing.

Directing attention now to FIG. 3, and with continuing attention to FIG. 2, additional details regarding coupling 500 are provided. As indicated in FIG. 3, coupling 500 includes a first engaging portion 500A and a second engaging portion 500B joined together by collar 502 which serves to substantially prevent relative motion between first engaging portion 500A and a second engaging portion 500B. Preferably, first engaging portion 500A and a second engaging portion 500B each comprise an outward extending annular ridge or the like which, when brought into a confronting relation with each other, are collectively configured to mate with corresponding structure defined by collar 502, as suggested in FIG. 3. It will be appreciated however, that coupling 500 and collar 502, either individually or collectively, may be configured in any number of alternate ways that would facilitate achievement of the functionality disclosed herein. In addition the connecting portions of the engaging portions 500A and 500B may be ridged to ensure that relative motion between the portions does not occur.

In one embodiment, first engaging portion 500A and a second engaging portion 500B each further includes a plurality of pins 504 that mate with corresponding grooves 202B and 204B, defined by first housing portion 202 and second housing portion 204, respectively. Thus, a rotary motion imparted to coupling 500 by way of handles 506 releasably joins first engaging portion 500A and a second engaging portion 500B to first housing portion 202 and second housing portion 204, respectively, by causing pins 504 to travel to the respective ends of grooves 202B and 204B. Preferably, grooves 202B and 204B are of such a length that a rotary motion of about 90 degrees is adequate to releasably couple first housing portion 202 to second housing portion 204. It will be appreciated that a rotary motion of about 120 degrees in the opposite direction will be effective to disengage coupling 500 and thus release first housing portion 202 from second housing portion 204.

It will be appreciated that the arrangement of coupling 500 with respect to first housing portion 202 and second housing portion 204 may be varied in a number of ways. For example, in one embodiment, first engaging portion 500A is integral with first housing portion 202, so that only second engaging portion 500B comprises pins 504. Correspondingly, only grooves 204B are present and grooves 202B are not required. In this embodiment, a rotation, preferably about 120 degrees, imparted to coupling 500 by way of handles 506 causes rotating pins 504, or bearings in another embodiment, to travel the length of grooves 204B so that coupling 500 thereby releasably joins first housing portion 202 to second housing portion 204.

Yet another embodiment employs essentially a reverse configuration of that just discussed. In particular, in this embodiment, second engaging portion 500B is integral with second housing portion 204, and only first engaging portion 500A includes pins 504. Correspondingly, only grooves 202B are present and grooves 204B are not required. In this embodiment, a rotation, preferably about 90 degrees, imparted to coupling 500 by way of handles 506 causes pins 504 to travel the length of grooves 202B so that coupling 500 thereby releasably joins first housing portion 202 to second housing portion 204.

Finally, it will be appreciated that other types of structure and devices may be usefully employed to achieve the functionality collectively provided by pins 504 and grooves 202B and 204B. Accordingly, other structures and devices that provide such functionality are contemplated as being within the scope of the present invention, wherein such other structures and devices include, but are not limited to, threaded connections, spring-biased connections, and the like.

Figure 4:
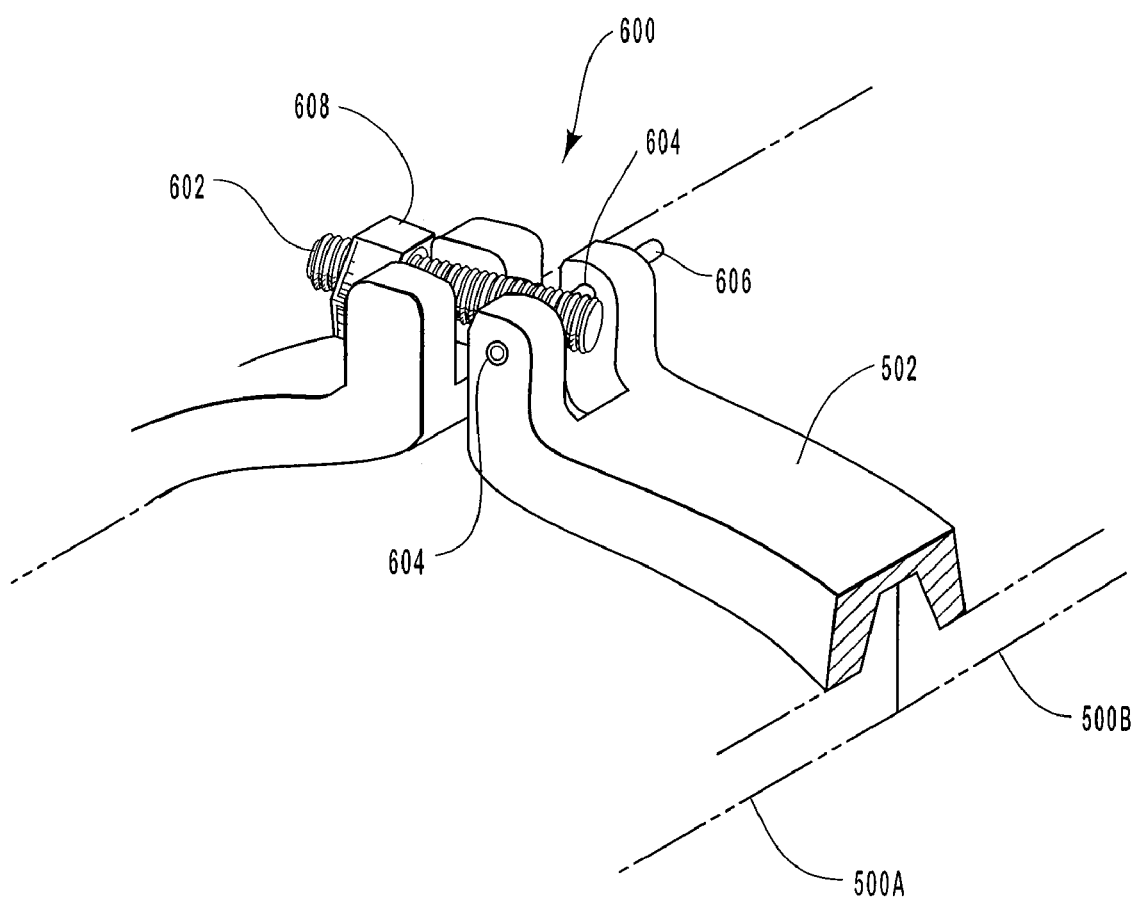
FIG. 4 is a perspective view indicating various details of a breakable link assembly that is an integral portion of a collar.

Directing attention now to FIG. 4, and with continuing attention to FIG. 3, additional details regarding collar 502 of coupling 500 are provided. In particular, collar 502 further includes a breakable link assembly 600. Generally, breakable link assembly 600 serves two primary purposes. First, breakable link assembly 600 serves to retain collar 502 securely in place about first engaging portion 500A and second engaging portion 500B of collar 502. Further, breakable link assembly 600 includes a sacrificial element that is designed to break, thereby allowing first engaging portion 500A and second engaging portion 500B to separate from each other, when a force, or forces, of predetermined magnitude are applied to particular elements of fluid transfer system 100, such as to valve assembly 200, or to fluid conduit 106.

In effect, when the sacrificial element breaks, then the coupling 500 is no longer capable of joining the first and second housings of the valve assembly and the valve assembly disassembles into two separate components. As previously described, fluid flow from each separate housing may be checked and when the valve assembly separates in this manner, fluid flow is checked and fluid spillage or leakage is thereby minimized.

As suggested in FIG. 4, collar 502 is essentially C-shaped, having an opening between its two ends. Breakable link assembly 600 is disposed across the opening thus defined and includes a threaded member 602, such as a bolt or the like, defining a bore (not shown) near one end. Preferably, the bore thus defined is substantially perpendicular to the longitudinal axis of threaded member 602. A shear pin 604 is slidably disposed in the bore and the opposing ends of shear pin 604 are received in collar 502 as indicated. Preferably, shear pin 604 is prevented from exiting the bore by way of cotter pins 606, or the like, disposed at either end of shear pin 604. It will be appreciated that shear pin 604 may alternatively be glued, welded, brazed, or otherwise bonded to collar 502 so as to prevent it from exiting the bore in threaded member 602.

Breakable link assembly 600 further includes a nut 608, or the like, engaged for advancement along threaded member 602. In operation, nut 608 is rotated so as to advance along threaded member 602 and thus draw the opposing ends of collar 502 securely together.

The operation of breakable link assembly 600 proceeds generally as follows. In the event a force, or forces, of predetermined magnitude in either a tensile or axial load are applied to valve assembly 200 and/or to fluid conduit 106, shear pin 604 will fracture and the valve assembly will disassemble. It will be appreciated that the materials and/or geometry of shear pin 604 may desirably be varied to adjust the point at which fracture will occur. It will further be appreciated that sacrificial elements other than shear pin 604 may usefully be employed. In general, any sacrificial element and/or breakable link assembly that provides the functionality, disclosed herein, of shear pin 604 and/or breakable link assembly 600 is contemplated as being within the scope of the present invention.

Upon fracture of shear pin 604, threaded member separates from collar 502, thus permitting the ends of collar 502 to move apart and thereby allow separation of first housing portion 202 and second housing portion 204. The functionality provided by breakable link assembly 600 thus ensures that in the event a predetermined level of force is applied to dry break valve assembly 200, or to components to which it is connected, dry break valve assembly 200 will break dry, and thus substantially prevent any material leakage of fluid. Further, breakable link assembly 600 substantially ensures that in the event such forces are applied, no material damage occurs to the components of fluid transfer system 100 (see FIG. 1). Thus, in addition to minimizing the fluid loss that would otherwise occur, the conduit 106 is preserved and damage is not done to the fluid source or the fluid destination.

Note that a variety of means may be profitably employed to perform the functions enumerated herein, of sealingly engaging first housing 204 with second housing 206 using coupler 500. Coupler 500 is an example of means for sealingly engaging first housing portion 202 and second housing portion 204. Accordingly, the structure disclosed herein simply represents one embodiment of structure capable of performing this function. It should be understood that this structure is presented solely by way of example and should not be construed as limiting the scope of the present invention in any way.

The valve assembly 200 and its various parts may be made of a range of materials depending on the type of fluid being transferred. Preferably, a material is chosen that can withstand corrosion and high temperature thermal cycling, such as carbon steel or stainless steel. Generally, valve assembly 200 may be constructed from Austenitic steel.

Figure 5:
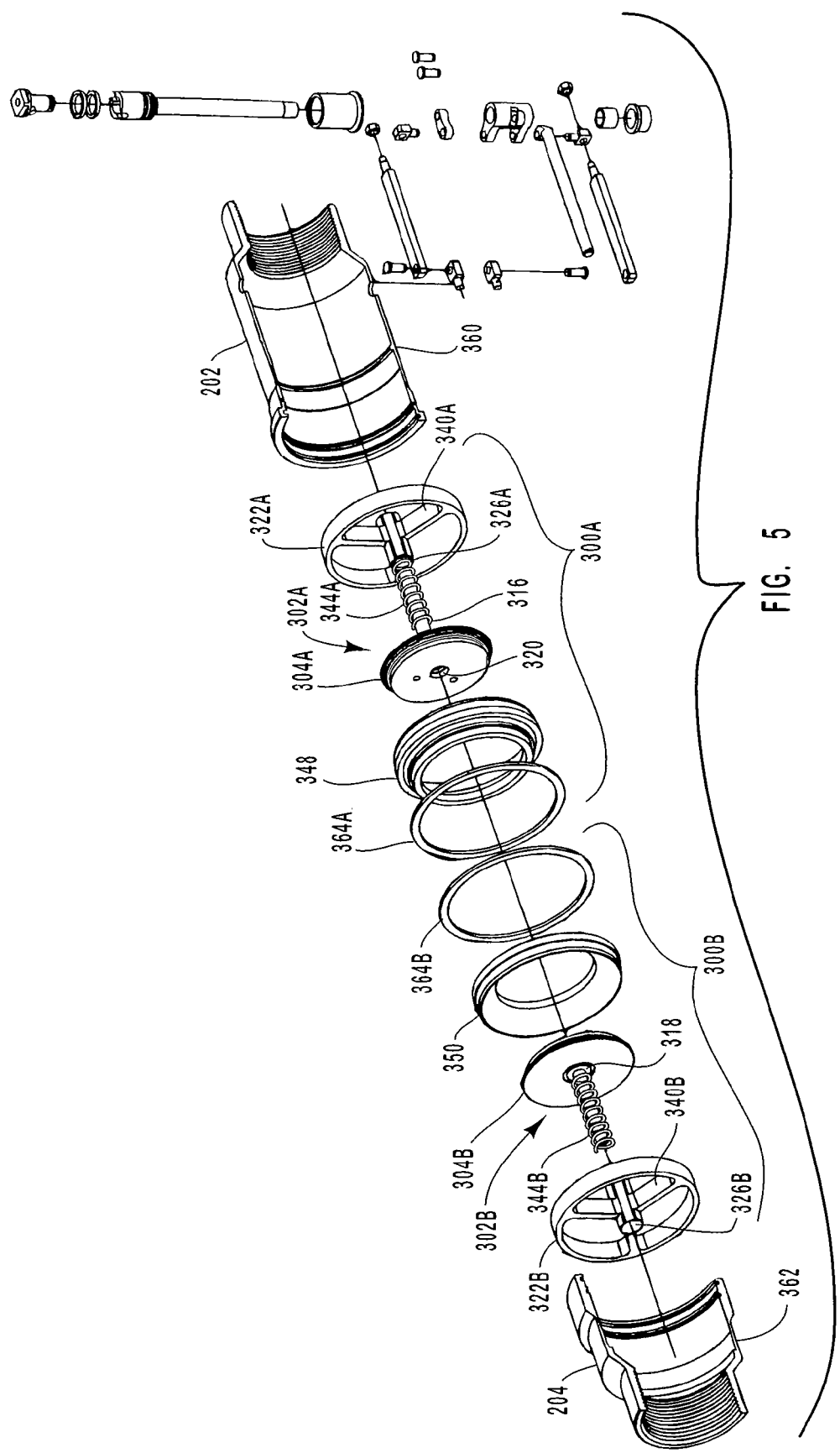
FIG. 5 is a perspective cutaway view of an embodiment of the present invention, illustrating various features of an actuating mechanism.

FIG. 5 shows an exploded perspective view of various features of the flow control assemblies of valve assembly 200. The following description of the housing configuration and flow control assemblies is by illustration only and not by way of limitation. Generally, flow control assembly 300A may comprise a flow control member 302A, a guide 322A, a resilient member 344A, a fitting member 348, and a snap ring 364A. Similarly, flow control assembly 300B may comprise a flow control member 302B, a guide 322B, a resilient member 344B, a sealing member 350, and a snap ring 364B.

Flow control assemblies 300A and 300B have a flow control member 302A and 302B, respectively. As shown in FIG. 3, flow control members 302A and 302B have a round disc-like valve gate 304A and 304B, respectively. Valve gate 304A contains a bore 320 substantially in the center of the valve gate so as to allow a substantially cylindrical piece to pass through the bore. It will be understood that bore 320 may be any geometrical shape (e.g., square, rectangular, polygonal, etc.) that will allow passage of a corresponding geometrical-shaped piece to pass through the bore.

Attached to valve gate 304A is a hollow driver shaft 316. Driver shaft 316 is placed in transverse relation to valve gate 304B. Preferably, driver shaft 316 is substantially concentric with bore 320 and contains substantially the same geometric shape as bore 320. Attached to valve gate 304B is a member 318, which may be solid or hollow. Driver shaft 316 and member 318 may be attached to valve gate 304A and 304B by any means known in the art, such as, but not limited to, welding, adhesive bonding, or may be formed integrally with valve gates 304A and 304B.

FIG. 5 further illustrates guides 322A and 322B. Guides 322A and 322B essentially add structural support to flow control assemblies 300A and 300B. Guides 322A and 322B contain bores 326A and 326B whose inner diameters correspond respectively with the outer diameters of driver shaft 316 and member 318. In practice, driver shaft 316 slidably passes through bore 326A, and, similarly, member 318 slidably passes through bore 326B. Preferably, guides 322A and 322B are essentially hollow except for three support bars generally designated as 340A and 340B. The hollow structure allows for structural members to pass through guides 322A and 322B and to be movably connected to valve gates 304A and 304B, which will be discussed in further detail later in this specification. However, it will be appreciated that guides 322A and 322B may be constructed having a partially solid configuration as long as the requisite area is present to allow for movement of parts.

FIG. 5 shows resilient member 344A and 344B which are placed onto driver shaft 316 and solid member 318, respectively. Resilient members 344A and 344B are shown in FIG. 5 to be springs. However, one skilled in the art will understand that resilient members 344A and 344B may be any structure which maintains a bias such as, but not limited to, a rubber material, an elastic material, polished metal, and the like.

FIG. 5 further depicts fitting member 348 and corresponding sealing member 350. The configuration of fitting member 348 and sealing member 350 will be discussed in more detail later in this specification. However, in general terms, fitting member 348 is tapered on one side to provide a valve seat for valve gate 302A. Similarly, sealing member 350 is tapered on one side to provide a valve seat for valve gate 302B. Preferably, valve gates 302A and 302B have corresponding tapers to allow for better sealing engagement.

As shown in FIG. 2, first housing portion 202 and second housing portion 204 are configured to allow for placement of flow control assemblies 300A and 300B to be disposed substantially within each housing. FIG. 5 shows ridge 360 placed on the interior surface of first housing portion 202. Ridge 360 acts as structural support for flow control assembly 300A. During assembly, guide 322A rests on ridge 360. Resilient member 344A is slid onto driver shaft 316, after which flow control member 302A is placed into first housing portion 202 with driver shaft 316 passing through bore 326A. Finally, fitting member 348 is placed into first housing portion 202 to complete the flow control assembly 300A. It will be understood from the drawings and foregoing discussion that flow control assembly 300B may be assembled in a manner similar to that for flow control assembly 300A.

It will be noted from FIG. 5, that second housing portion 204 has a ledge 362 to provide a similar structural function as ridge 360. It will be appreciated that first housing portion 202 and second housing portion 204 may have structural ridges and grooves on the interior surface of the housing to provide for better structural engagement of corresponding parts of flow control assemblies 300A and 300B.

In one embodiment, snap rings 364A and 364B are provided for a better sealing engagement when flow control assembly 300A and 300B are assembled and for easier disassembly during maintenance of the valve assembly. In another embodiment, valve gate 304A and 304B may have an O-ring placed along the taper to provide for better sealing engagement.

Figure 6:
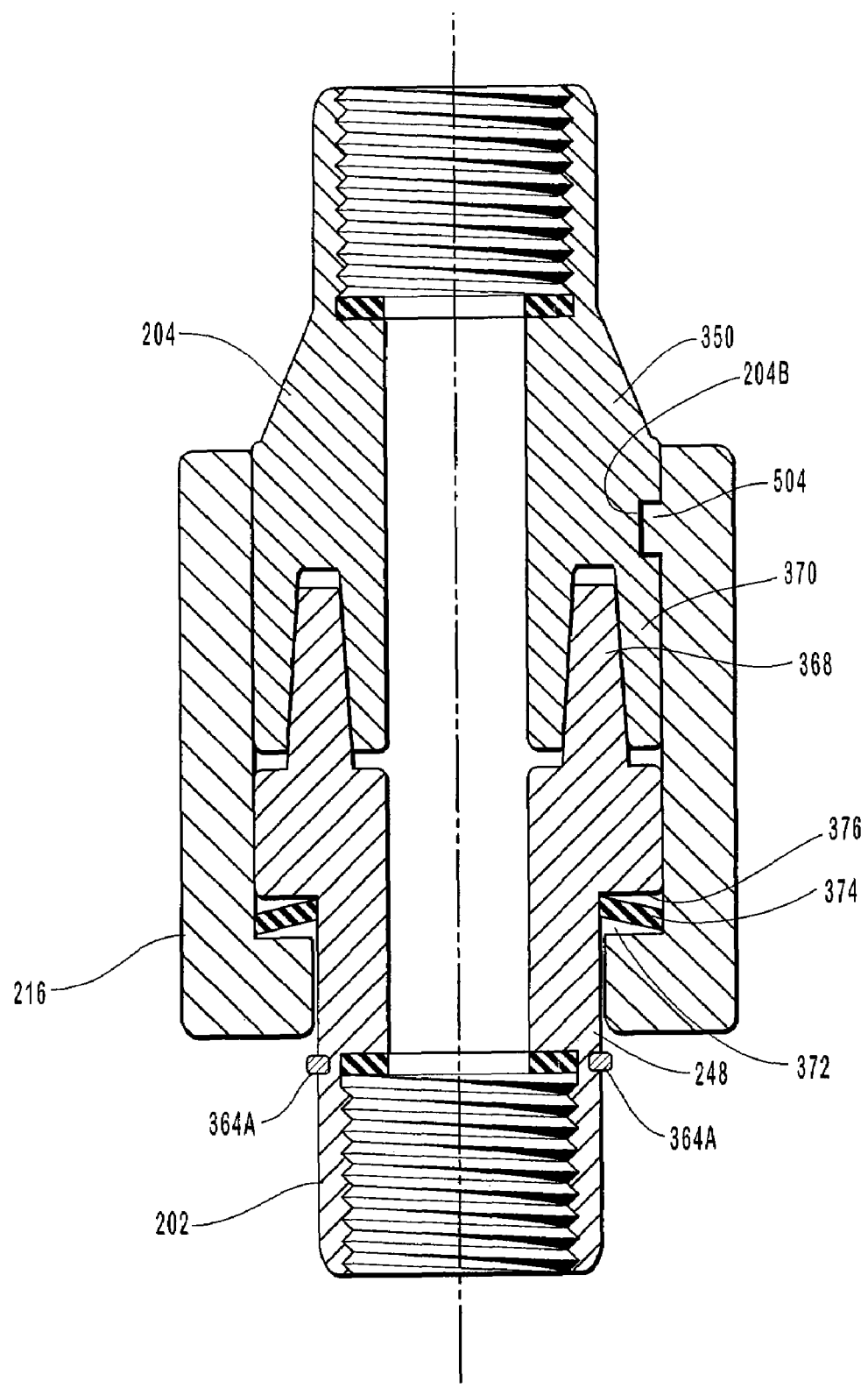
FIG. 6 is a cross section view of an exemplary sealing interface within an embodiment of a dry break valve assembly.

FIG. 6 is a cross-section of an exemplary embodiment of the dry break valve assembly, illustrating the sealing engagement between first housing portion 202 and second housing portion 204. First housing portion 202 and second housing portion 204 are joined in sealing engagement preferably in at least two ways—at their outer rims and between fitting member 348 and sealing member 350.

FIG. 6 shows the outer rims of first housing portion 202 and second housing portion 204 in sealing engagement. During assembly of dry break valve assembly 200, coupler 500 acts to join the outer rims of first housing portion 202 and second housing portion 204 to join them in sealing engagement. Tightening of the coupler 500 further acts to seal valve assembly 200. Preferably, L-shaped grooves 204B are configured such that sealing engagement occurs when pins 504 are engaged with L-shaped grooves 204B.

Preferably, a sealing feature is also provided between fitting member 348 and sealing member 350. As shown in FIG. 6, fitting member 348 is provided with a tapered ridge 368 running circumferentially around fitting member 348. Similarly, sealing member 350 is provided with a corresponding tapered channel 370 running circumferentially around sealing member 350. The terms "peripheral" and "circumferential" are adopted herewith to describe tapered ridge 368 and tapered channel 370 since tapered ridge 368 is disposed around the perimeter of an interior cavity formed within fitting member 348. Thus, peripheral tapered ridge 368 peripherally defines the opening of a cavity formed through fitting member 350. By providing ridge 368 and channel 370 with tapered surfaces, greater surface area is provided which allows an improved sealing engagement without increasing the diameter of the embodiment as is required, for example, to increase the sealing surface area when using a common flange joint.

Coupler 500 is provided with compressing edge 372 which biases compensating washer(s) 374 against abutting edge 376 of fitting member 348. Coupler 500 attaches to the external surface of sealing member 350 by the twist coupling method discussed previously and described in more detail hereinafter. Compensating washer(s) 374, shown best in FIG. 6, serves a dual purpose. Compensating washer(s) 374 provides compensation due to "creeping" (degradation of the seal due to thermal contraction) which occurs at low temperatures. Compensating washer(s) 374 also serves to bias coupler 500 in a direction which will hold pins 504 in the L-shaped grooves 204B and thus provides the tension necessary for proper operation of the twist coupling. In this regard, when pins 504 are seated in the L-shaped grooves 204B, compensating washer(s) 374 biases fitting member 348 towards sealing member 350, and thus assists in forming a proper seal.

As can be seen best in FIG. 6, fitting member 348 is provided with an abutting edge 376 while coupler 500 is provided with a compressing edge 372. One pin 504 and L-shaped groove 204B can be seen in the lower portion of FIG. 6. Compensating washer(s) 374 is positioned so that compressing edge 372 and abutting edge 376 are urged apart. Pins 504, grooves 204B, and compensating washer(s) 374, are arranged such that sealing contact between tapered ridge 368 and tapered channel 370 occurs when pins 504 are situated in grooves 204B. This arrangement provides that when pins 504 are received in the grooves 204B, compensating washer(s) 374 is partially or fully compressed.

It should be understood that compensating washer(s) 374 may be replaced by structures other than that shown and described in connection with FIG. 6 above. For example, if the embodiment is to be used only under moderate temperature and pressure conditions, compensating washer(s) 374 may be a washer of a resilient or elastic material, such as rubber. Depending upon the application, those skilled in the art will be able to determine what alternative structures and materials may be used for compensating washer(s) 374. The washer(s) 374 is preferably compressible so as to allow pins 504 to seat in grooves 204B while urging tapered ridge 368 into sealing engagement with tapered channel 370. This arrangement provides a coupling which is highly resistant to loosening due to vibration.

By the above-described arrangement, tapered ridge 368 is held in tight sealing arrangement with tapered channel 370. Note that a variety of means may be profitably employed to perform the functions enumerated herein, of providing a sealing engagement between first housing portion 202 and second housing portion 204. Fitting member 348 and sealing member 350 are examples of means for sealingly engaging first housing portion 202 and second housing portion 204. Accordingly, the structure disclosed herein simply represents one embodiment of structure capable of performing these functions. It should be understood that this structure is presented solely by way of example and should not be construed as limiting the scope of the present invention in any way.

Figure 7:
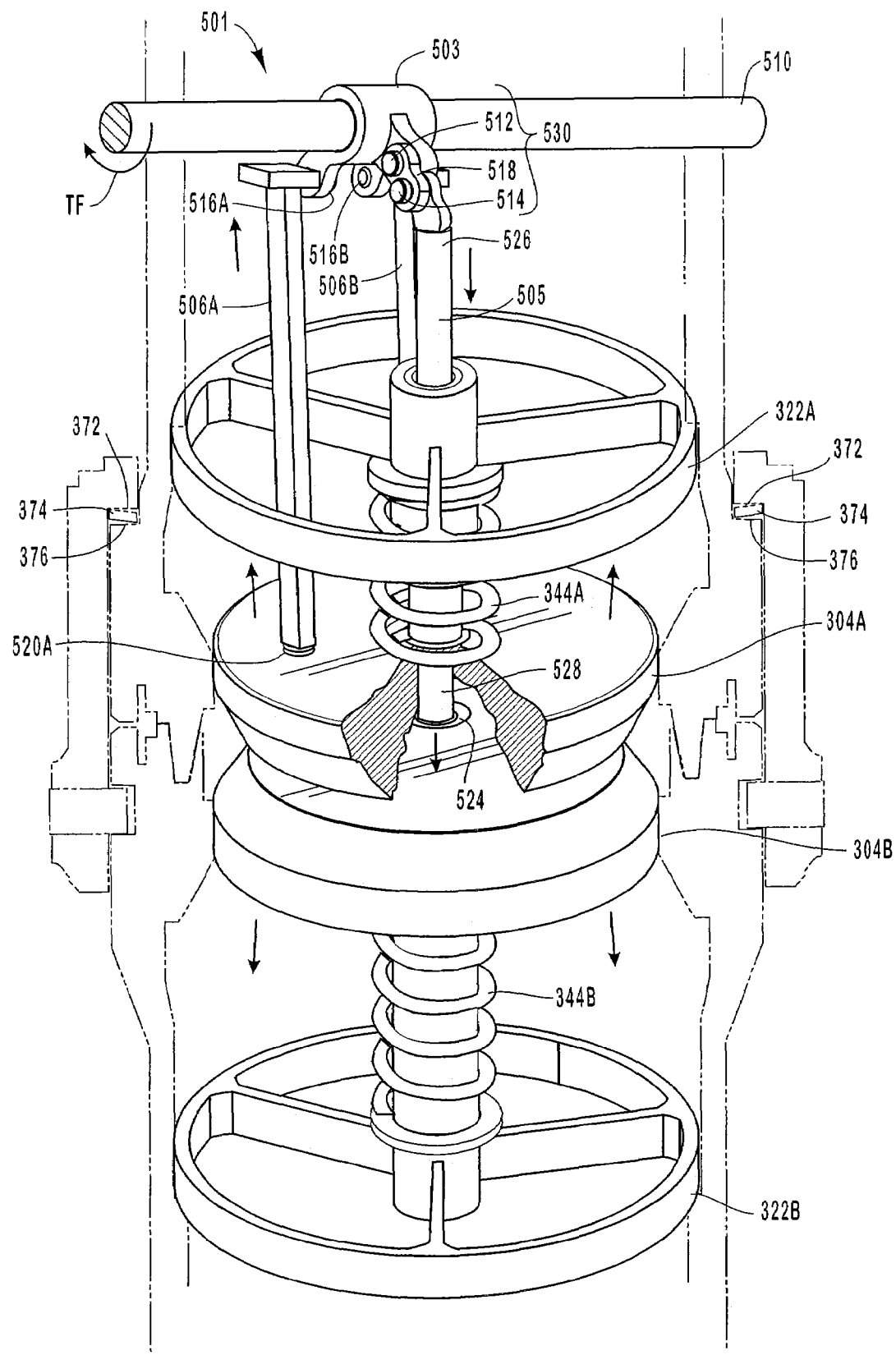
FIG. 7 is a perspective view illustrating various features of an exemplary embodiment of an actuating mechanism disposed within an embodiment of a dry break valve assembly.

In one embodiment, an actuating mechanism is used to operate the flow control assemblies 300A and 300B. FIG. 7 illustrates a perspective view of an actuating mechanism 501. Preferably, actuating mechanism 501 uses cam action in operation. Cam action refers generally to a sliding piece in a mechanical linkage used especially in transforming rotary motion into linear motion or vice versa.

As depicted in FIG. 7, actuating mechanism 501 has a cam handle 503. Cam handle 503 provides three attachment sites, 512, 516A, and 516B. Attached to site 512 is cam arm 518, which in turn is connected to driver 505 at attachment site 514. Driver 505 has a first end 526 and a second end 528. Driver 505 is shown in FIG. 7 to be essentially cylindrical in shape. However, it will be understood that driver 505 may be any geometric shape which will correspond with driver shaft 316 and guide bore 326A. Driver 505 is essentially a mechanical piece for imparting motion to components of the dry break valve assembly as will be discussed in further detail later in the specification. Attached to sites 516A and 516B are displacement shafts 506A and 506B. Displacement shafts 506A and 506B are shown in FIG. 7 to be essentially rectangular in shape. However, it will be understood that displacement shafts 506A and 506B may be manufactured in any geometric shape, such as cylindrical, elliptical, square, and the like, without departing from the scope of the present invention.

Preferably the connections of driver 505 and displacement shafts 506A and 506B to cam handle 503 at sites 512, 516A and 516B are pin connections such that the parts may be movably connected. However, it will be understood that such connections may be done in a variety of ways known to the art including, but not limited to a bolt, a screw, pins, and the like.

As shown in FIG. 2, cam handle 402, also referred to as an actuating lever, is connected to an actuating arm 510, which, in turn, is connected to an actuating lever 508. Actuating arm 510 is substantially disposed within first housing portion 202. Actuating arm 510 is preferably placed such that it is substantially over the center of actuating mechanism 501. Preferably actuating arm 510 and cam handle 503 are connected such that cam handle 503 cannot move independently of actuating arm 510.

FIG. 7 also shows valve gates 304A and 304B in relation to actuating mechanism 501. Valve gate 304A is shown operably connected to actuating mechanism 501 while valve gate 304B is disposed in operative relation to the actuating mechanism. Actuating mechanism 501 effects motion in both valve gate 304A and 304B at substantially the same time.

Valve gate 304A is shown with second end 528 of driver 505 disposed through bore 320. Preferably, in the resting position, second end 528 is substantially disposed within bore 320. However, it will be understood that second end 528 may be partly out of bore 320 without departing from the scope of the present invention. The driver 505 is sized to slidably pass through bore 320 without substantial obstruction from bore 320.

Displacement shafts 506A and 506B are shown to be connected to valve gate 304A at attachment sites 520A and 520B. Bore 320 and sites 520A and 520B are placed in a triangular configuration with sites 520A and 520B being placed substantially equidistant from bore 320. Sites 520A and 520B are also placed substantially equidistant from actuating arm 510 such that displacement shafts 506A and 506B are in substantial alignment with one another. Preferably the connections between displacement shafts 506A and 506B and connection sites 520A and 520B are pin connections such that the parts may be movably connected. However, it will be understood that the parts may be connected by known means in the art, such as, but not limited to, welding, bolting, and the like, without exceeding from scope of the present invention.

Figure 7A:
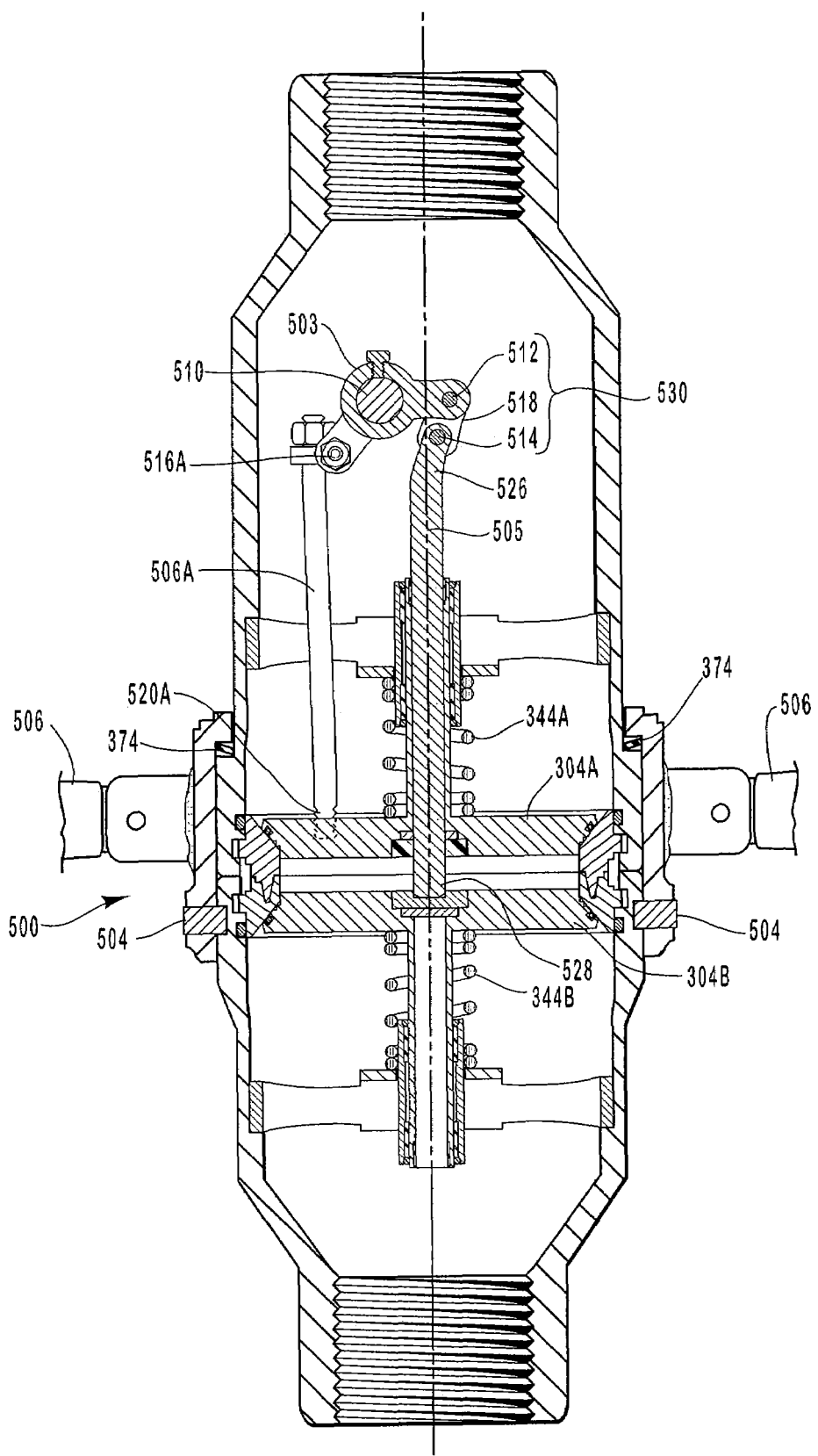
FIG. 7A is a side view illustrating various features of an embodiment of an actuating mechanism positioned so as to allow fluid flow through the dry break valve assembly.
Figure 7B:
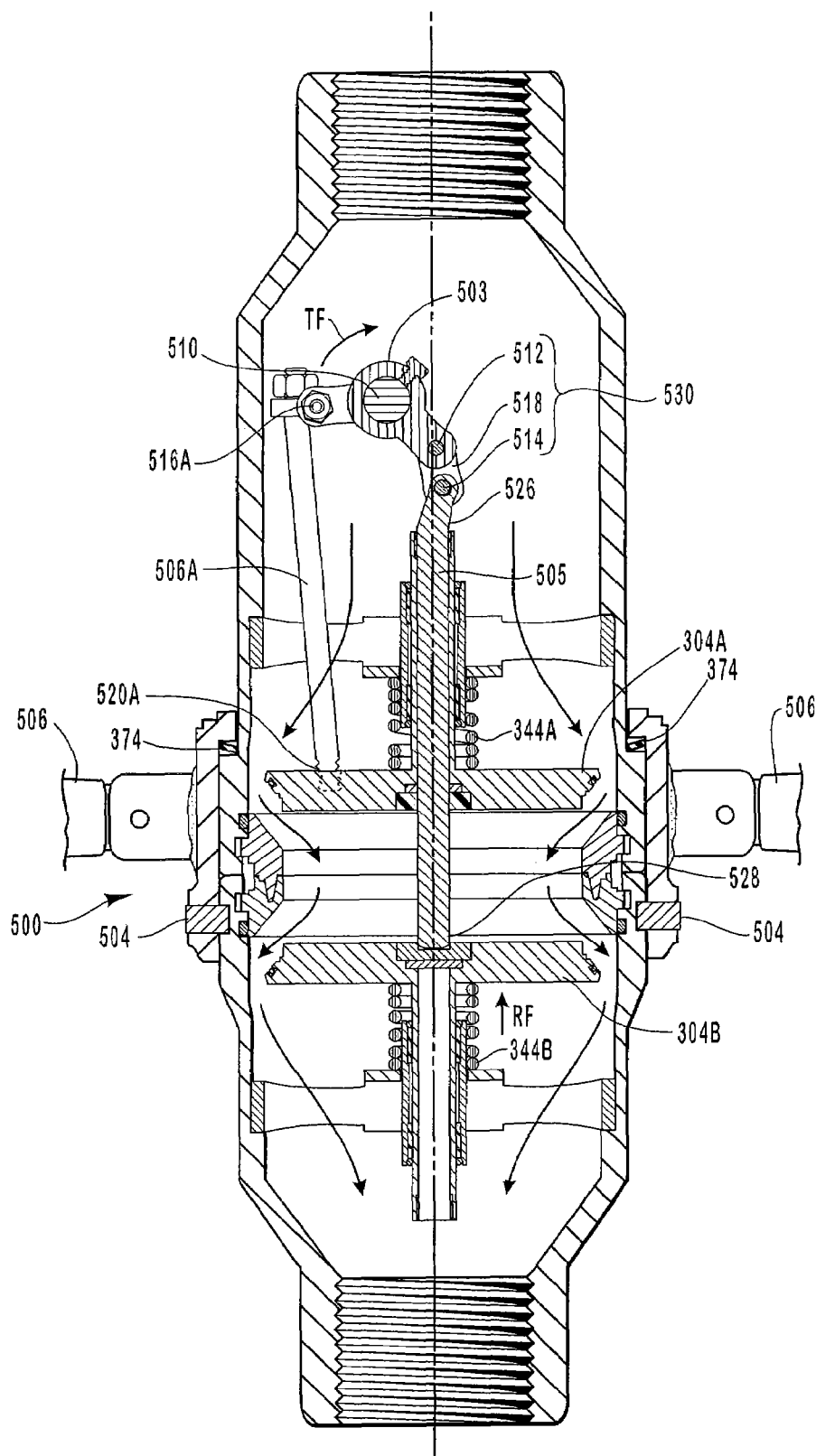
FIG. 7B is a side view illustrating various features of an embodiment of an actuating mechanism positioned so as to substantially prevent fluid flow through the dry break valve assembly.

Referring now to FIGS. 7A and 7B, the operation of actuating mechanism 501 will be discussed in detail. FIG. 7A shows a side view of actuating mechanism 501 at rest. Attachment site 512, cam arm 518, and attachment site 514 create a joint 530. Generally, actuating mechanism 501 operates as follows: the operator depresses the actuating lever 402 (shown in FIG. 2) and then the operator rotates actuating lever 402 which transmits a torque force (TF) through actuating arm 510 (not shown). The torque force (TF) is shown in FIG. 7B in the direction of the arrows. Such torque force (TF) rotates cam handle 503 which in turn rotates sites 512, 516A, and 516B (not shown). Thus, driver 505, and displacement shafts 506A and 506B (not shown) will be in motion at substantially the same time.

As cam handle 503 rotates, site 512 rotates in a downward direction forcing motion through cam arm 518 and, in turn, forcing driver 505 in a downward direction. Driver 505 passes through bore 320 such that second end 528 of the driver comes into contact with valve gate 304B. The downward motion of driver 505 pushes against valve gate 304B, which displaces valve gate 304B. The displacement of valve gate 304B forces resilient member 344B in a biased position. In one embodiment, located substantially at the center of valve gate 304B is a groove 524. The shape of groove 524 corresponds with the geometric shape of the end face of driver 505 such that driver 505 engages groove 524.

At substantially the same time as site 512 is in motion, sites 516A and 516B are rotating in an upward direction, thus pulling displacement shafts 506A and 506B in an upward direction. This upward motion pulls at attachment sites 520A and 520B (not shown), which in turn pulls valve gate 304A upward, displacing valve gate 304A. The displacement of valve gate 304A forces resilient member 344A in a biased position. Thus, at substantially the same time, valve gates 304A and 304B are displaced or opened to establish fluid communication between the valve gates. FIG. 7B shows a side view of the actuating mechanism in full operation (i.e., fully opened) with valve gates 304A and 304B being displaced or opened. Thus, at least indirectly, actuating mechanism 501 acts to open both valve gates 304A and 304B at substantially the same time.

When actuating mechanism 501 is in fully open, with valve assembly 200 completely assembled, actuating mechanism 501 will lock into place automatically. This automatic locking feature is provided by the equilibrium of forces provided by the torque force (TF) and an equal and opposite retention force (RF) created by resilient member 344B. During actuation, cam arm 518 acts to shift attachment site 512 from attachment site 514, such that the sites are offset from one another as shown in FIG. 7B.

In other words, when actuating mechanism 501 is completely actuated, joint 530 is in an overextended position. When actuating mechanism 501 is fully actuated, resilient member 344B is depressed in a biased position. The retention force (RF) created by biased resilient member 344B acts upwardly through valve gate 304B to driver 505 to keep joint 530 locked in an overextended position. Once the retention force (RF) is applied, the torque force (TF) is no longer required and actuating mechanism 501 will remain locked until the retention force (RF) is removed. Thus, the present invention provides for an automatic locking mechanism when the actuating mechanism 501 is fully opened and dry break valve assembly 200 is fully assembled.

In one embodiment, dry break valve assembly 200 has an automatic check valve feature (i.e., fail closed feature). When the sealing engagement between first housing portion 202 and second housing portion 204 is broken, valve assembly 200 automatically closes to prevent substantial leakage of fluid. As discussed above, valve gates 304A and 304B are maintained in the open position by applying a torque force (TF) and/or a retention force (RF). When actuating mechanism 501 is fully activated, and the torque force (TF) is removed, actuating mechanism 501 remains locked due to the retention force (RF) as discussed above. Releasing the retention force (RF) will cause actuating mechanism 501 to automatically close. Essentially, if no torque force (TF) or retention force (RF) is applied, actuating mechanism 501 is predisposed to spring back into its original position because resilient members 344A and 344B are biased in the closed position, i.e., valve gates 304A and 304B close at substantially the same time. Release of the retention force (RF) may occur when first housing portion 202 is separated from sealing engagement with second housing portion 204. It will be understood that separation of first housing portion 202 from second housing portion 204 may occur manually or automatically. Thus, the present invention provides for automatic checking of fluid flow whenever the valve assembly is disassembled, whether automatically or manually.

While, in the case of some embodiments disclosed herein, it is useful to provide a fluid system component, such as a dry break valve assembly, having mating halves, or portions, that can be readily engaged and disengaged under a variety of pressure conditions, it is useful in other situations to be able to prevent disengagement of the mating portions of the dry break valve when the pressure in the line wherein the dry break valve is employed has exceeded, or dropped below, as applicable, a predetermined level. With the foregoing in view, attention is directed now to FIG. 8 wherein various details are provided regarding aspects of an alternative embodiment of the dry break valve assembly, generally denoted at 700. As the operational and structural aspects of the illustrated embodiment are similar in many regards to those of other embodiments disclosed herein, the following discussion will focus primarily on selected aspects of the illustrated embodiment.

In particular, the dry break valve assembly 700 includes a first housing portion 702 and second housing portion 704 removably joined together by a coupling 800. While, in the illustrated embodiment, coupling 800 is integral with first housing portion 702, coupling 800 comprises a component discrete from both first housing portion 702 and second housing portion 704 in some alternative embodiments. Note that, as discussed elsewhere herein, the use of coupling 800 is not limited to dry break valve assembly 700

With continuing reference to aspects of the first and second housing portions, the first housing portion 702 and second housing portion 704 each include a corresponding conduit connector 702A and 704A, respectively, configured to attach to a fluid conduit 106 (FIG. 1) or other fluid system component, wherein such attachment may be accomplished in a variety of ways including, but not limited to, welding, brazing and soldering. Other exemplary types of conduit connectors 702A and 704A that may be employed include compression fittings and threaded fittings.

Figure 8:
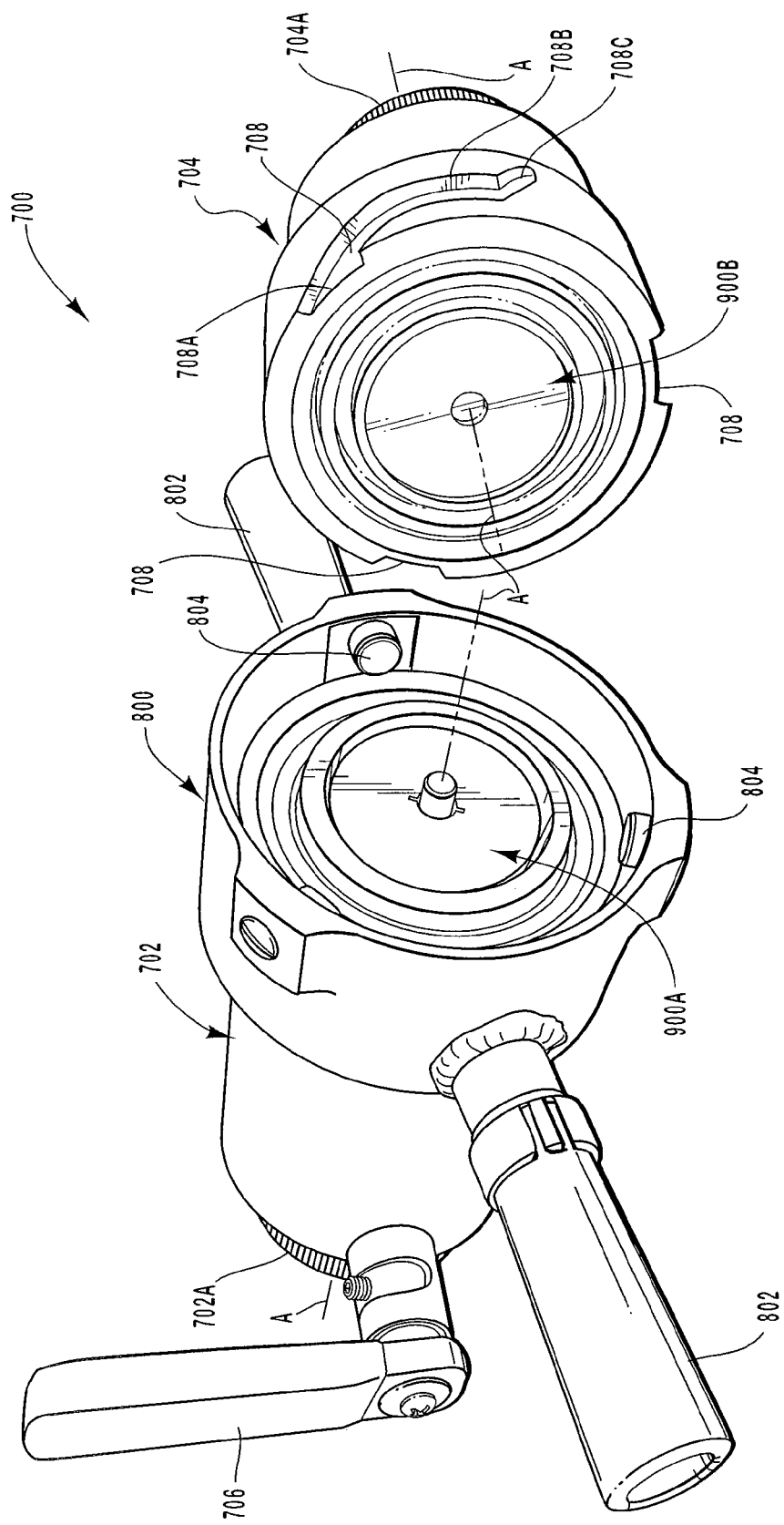
FIG. 8 is a perspective view of an alternative embodiment of a dry break valve assembly depicting various features of an exemplary embodiment of a groove arrangement that includes three grooves each of which include a terminal segment.

As indicated in the exemplary embodiment illustrated in FIG. 8, the first housing portion 702 and second housing portion 704 each further include a corresponding flow control assembly 900A and 900B, respectively, that are operated by way of an actuating mechanism (see, e.g., FIG. 7) and associated actuating lever 706, as described elsewhere herein. As discussed in further detail below, rotary motion for engaging and disengaging first housing portion 702 and second housing portion 704 is imparted by way of handles 802 joined to coupling 800.

In general, the engagement of first housing portion 702 and second housing portion 704 is achieved by way of mating pins and grooves, aspects of which are illustrated in FIG. 8. More specifically, coupling 800 includes three engagement members, such as pins 804, spaced about its circumference and configured and arranged to engage second housing portion 704, as discussed below. In an alternative embodiment discussed herein, pins 804 are replaced with a plurality of rollers connected to coupling 800. The use of rollers in place of pins is useful, for example, where coupling 800 is relatively large, and significant frictional forces must otherwise be overcome to operate coupling 800 in the manner described below.

In correspondence with pins 804, second housing portion 704 includes three grooves 708, each traversing an arc β of about one hundred twenty (120) degrees about the circumference of second housing portion 704. The width and depth of grooves 708 generally correspond to the diameter and length, respectively, of pins 804. In the illustrated embodiment, each groove 708 includes three connected portions, or segments. Specifically, each groove 708 includes an entry segment 708A, an intermediate segment 708B, and a terminal segment 708C. In some alternative embodiments, grooves 708 are defined by a structure that is discrete from, but attached or attachable to, second housing portion 704. In some embodiments, the terminal segment comprises a segment of a groove, other than the entry segment, that cooperates with a longitudinal axis such as axis AA (see, for example, FIG. 8A) to define an oblique angle. In yet other embodiments, the terminal segment may be generally perpendicular to a longitudinal axis (see, for example, FIG. 12). Moreover, the number and arrangement of intermediate segments in a groove, or grooves, may be varied as/if desired (see, for example, FIGS. 8A and 12).

It should be noted that the foregoing configuration is exemplary only and aspects such as, but not limited to, the size, number, geometry, arrangement, offset angle θ and arc length β (of grooves 708) and disposition of one or more of the embodiments of the pins and grooves disclosed herein, including pins 804 and grooves 708, may be modified as necessary to suit the requirements of a particular application. Consistent with the foregoing, details concerning various alternative embodiments of grooves are set forth elsewhere herein (see FIG. 12). Moreover, at least one embodiment of the invention includes four engagement members, examples of which include pins 804 and rollers 1106A (FIG. 10A).

Figure 8A:
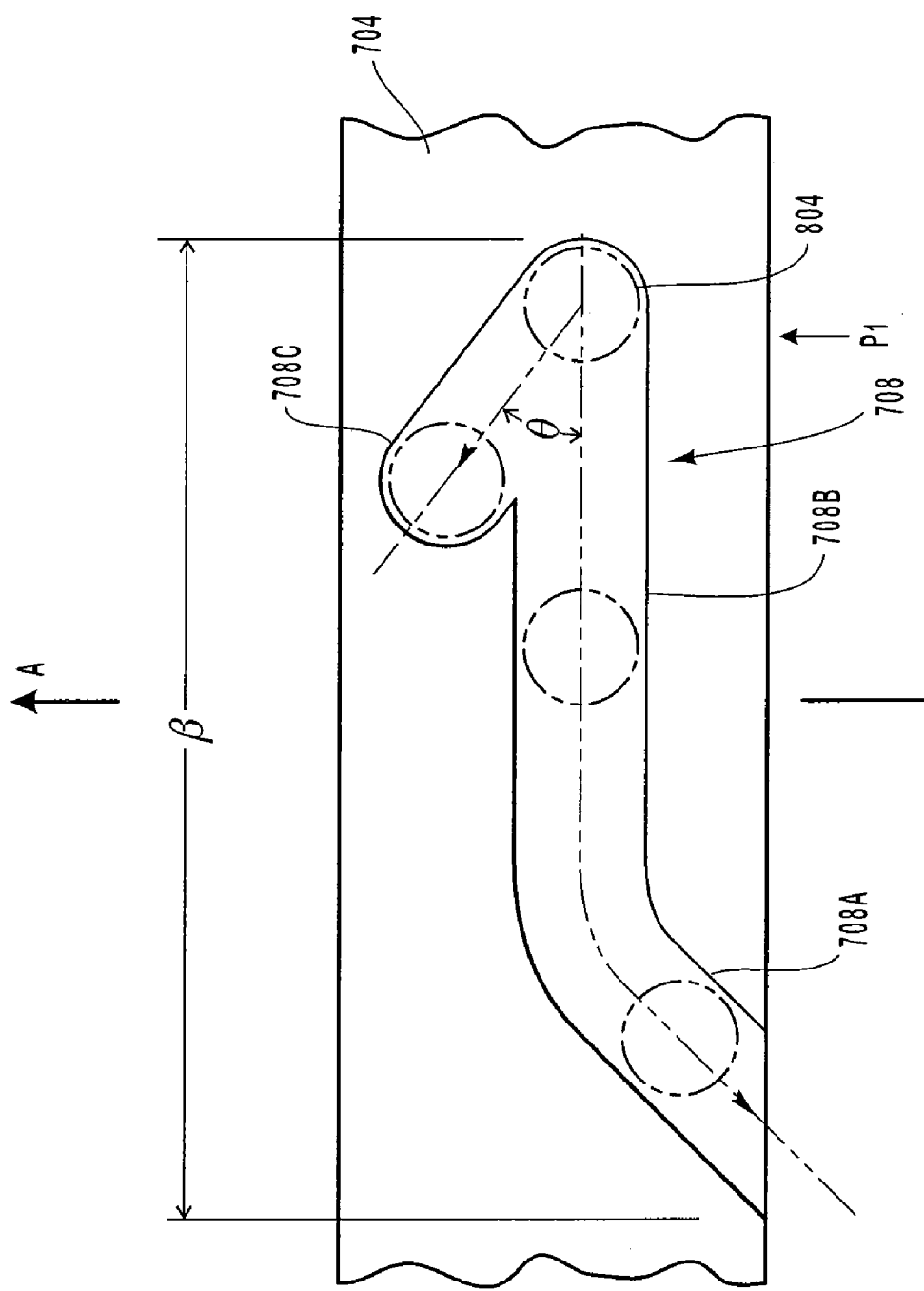
FIG. 8A is a section view illustrating various aspects of the exemplary embodiment of the grooves depicted in FIG. 8.

In general, the engagement of first housing portion 702 and second housing portion 704 is effected by positioning each pin 804 in a corresponding groove 708 and causing pins 804 to travel along grooves 708, as suggested in FIG. 8A. More particularly, first housing portion 702 and second housing portion 704 are brought together until each pin 804 of coupling 800 is positioned in the entry segment 708A of a corresponding groove 708 of second housing portion 704. Rotation of second housing portion 704 is then initiated, by way of handles 802. As a result of the angular orientation of entry segments 708A with respect to a longitudinal axis AA defined by the dry break valve assembly 700, the initial rotation of first housing portion 702 causes second housing portion 704 to be drawn toward first housing portion 702.

Continued rotation of first housing portion 702 causes pins 804 to complete their traverse of corresponding entry segments 708A, and move into their respective intermediate segments 708B. In at least some cases, pins 804 travel to the respective ends of intermediate segments 708B. In any event, pins 804 remain in intermediate segments 708B until such time as a predetermined pressure level is attained in a fluid passageway 1000 (FIG. 9) collectively defined by first housing portion 702 and second housing portion 704.

Figure 9:
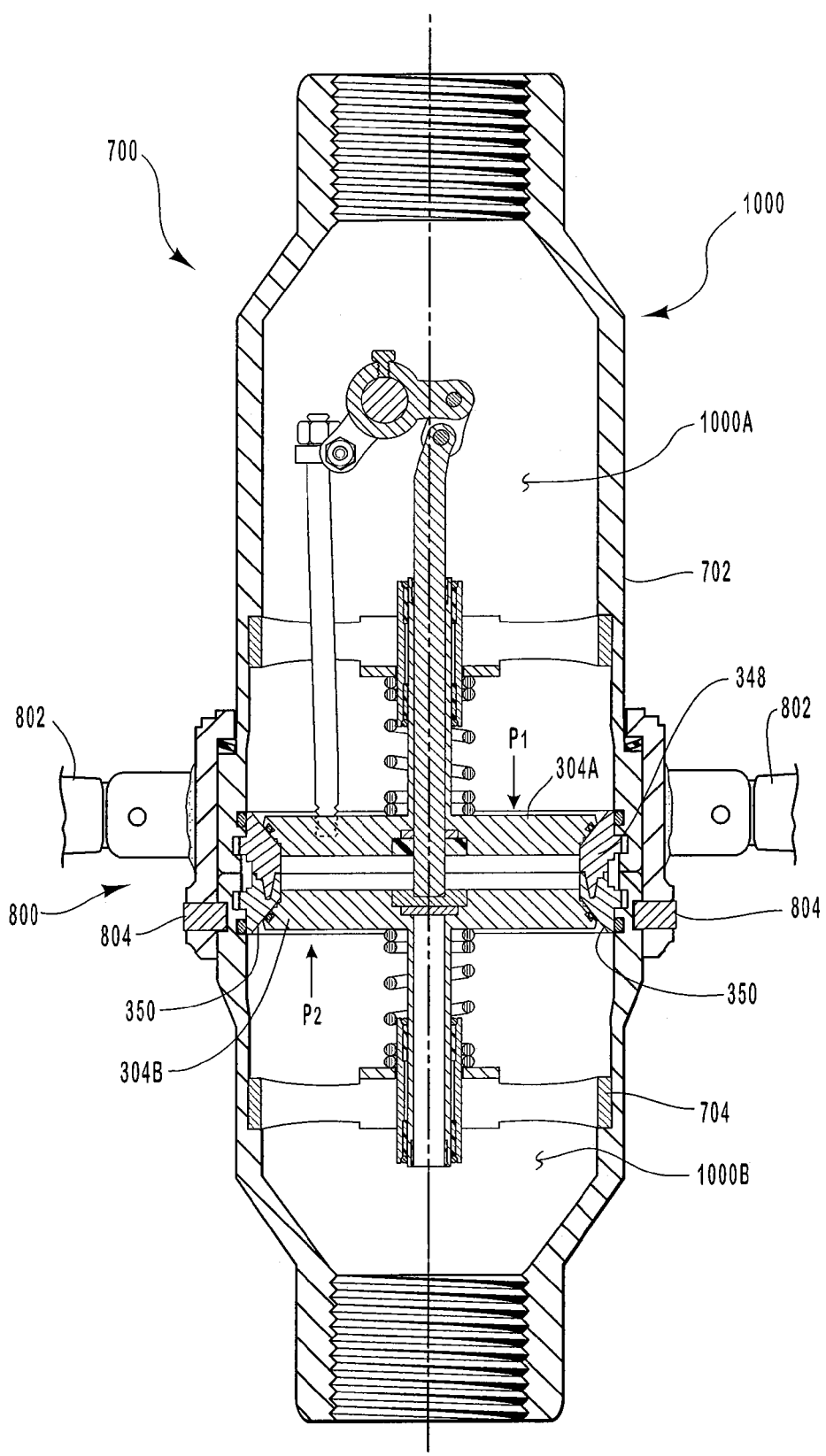
FIG. 9 is a section view of an exemplary embodiment of a dry break valve assembly that illustrates aspects of the relation between the fluid pressure in the fluid passageway and the engagement of the first and second housing portions.

With continuing reference to FIGS. 8 and 8A, and directing attention now to FIG. 9, details are provided concerning various operational aspects of an exemplary embodiment of dry break valve assembly 700. As suggested above, the engagement of first housing portion 702 and second housing portion 704 results in the definition of a fluid passageway, generally denoted at 1000 in FIG. 9, and comprising portions 1000A and 1000B.

Prior to commencement of a fluid transfer operation, fluid is introduced into portion 1000A, for example, by way of a conduit 106 (FIG. 1) connected to first housing portion 702, thereby pressurizing portion 1000A. The pressure thus exerted, denoted at $P_1$ in FIG. 10, acts on the back of valve gate 304A, which is in contact with sealing member 348 attached to first housing portion 702. As a result of this arrangement of valve gate 304A, sealing member 348, and first housing portion 702, the exertion of $P_1$ in this way causes first housing portion 702 to move slightly forward into closer engagement with second housing portion 704, thereby forcing pins 804 to lock up into corresponding terminal segments 708C of grooves 708, as suggested in FIG. 8A.

In the illustrated embodiment, the forward motion of first housing portion 702 may, depending on the position of pins 804 prior to pressurization of portion 1000A, be accompanied by a rotary motion of first housing portion 702 as well, as pins 804 travel along intermediate segment 708B and come to rest in terminal segment 708C of groove 708. Further, one or both of first housing portion 702 and second housing portion 704 may or may not rotate, depending upon whether one or both such portions 702 and 704 are otherwise restrained from rotational movement during the initial pressurization of portion 1000A of fluid passageway 1000. In yet other embodiments, little or no rotation of first housing portion 702 or second housing portion 704 occurs.

As suggested in FIG. 8A, rotary motion of first housing portion 702, at least, is facilitated, at least in part, by the geometric relation of intermediate segment 708B with terminal segment 708C, expressed as an offset angle θ. Specifically, as the action of pressure $P_1$ on the back of valve gate 304A (FIG. 9) causes first housing portion 702 to move forward into closer engagement with second housing portion 704, the geometry that defines offset angle θ guides each pin 804 laterally, as well as forward, from the intermediate segment 708B into its corresponding terminal segment 708C.

Once pins 804 are seated thus, the continuing exertion of pressure $P_1$ on the back of valve gate 304A aids in the retention of pins 804 in their corresponding terminal segments 708C (FIG. 8A) and resists motion of pins 804 in the opposite direction, that is, out of their corresponding terminal segments 708C. As a result, first housing portion 702 and second housing portion 704 of dry break valve assembly 700 cannot be disengaged from each other until the fluid pressure in portion 1000A of fluid passageway 1000 has been reduced to a predetermined level or differential, or until the pressure in portions 1000A and 1000B has been equalized. Thus, the pins 804 and grooves 708 cooperate with each other, and advantageously employ the line pressure, to ensure a secure connection between first housing portion 702 and second housing portion 704 of dry break valve assembly 700 under a variety of pressure conditions. Note that the arrangement and configuration of pins 804 and grooves 708 in this exemplary embodiment, and others disclosed herein, may be varied to function in concert with either positive or negative (vacuum) pressures in fluid passageway 1000.

Note further that a variety of means may be profitably employed to perform the functions, disclosed herein, of pins 804 and grooves 708, and rollers 1106A and grooves 1102C discussed below. Examples of such functions include, but are not limited to, releasably engaging first and second elements of a fluid system component, maintaining engagement of such first and second elements so long as the line fluid pressure meets or exceeds a first predetermined value, and facilitating disengagement of such first and second elements when the line fluid pressure has reached a second predetermined value. Such first and second elements of a fluid system include, but are not limited to, first housing portion 702 and second housing portion 704 of dry break valve assembly 700, and sleeve 1102 and collar 1106 of cap assembly 1100. Thus, pins 804 and grooves 708, and rollers 1106A and grooves 1102C, respectively, comprise exemplary structures that function as a means for releasable engagement. It should be understood that such structures are presented solely by way of example and should not be construed as limiting the scope of the present invention in anyway.

While, in the foregoing discussion, various operational aspects of an exemplary embodiment of dry break valve assembly 700 are considered in the situation wherein a fluid processing operation is initiated by pressurization of portion 1000A of fluid passageway 1000, yet other fluid processing operations are commenced by initially pressurizing portion 1000B of fluid passageway 1000. As discussed below however, pins 804 and grooves 708 provide comparable functionality regardless of which portion of fluid passageway 1000 is initially pressurized.

In particular, fluid introduced into portion 1000B of fluid passageway 1000 prior to commencement of a fluid transfer operation serves to pressurized portion 1000B. The pressure thus exerted, denoted at $P_2$ in FIG. 9, acts on the back of valve gate 304B, which is in contact with sealing member 350 attached to second housing portion 704. As a result of this arrangement of valve gate 304B, sealing member 350, and second housing portion 704, the exertion of $P_2$ in this way causes second housing portion 704 to move slightly forward into closer engagement with first housing portion 702, thereby forcing terminal segments 708C of grooves 708 into engagement with corresponding pins 804, as suggested in FIG. 8A.

Similar to the case where portion 1000A is initially pressurized, the pressurization of portion 1000B may, depending on the position of pins 804 and terminal segments 708C prior to such pressurization, be accompanied by a rotary motion of second housing portion 704 as well, as terminal segments 708C of groove 708 travel into a position where they can engage corresponding pins 804. Of course, one or both of first housing portion 702 and second housing portion 704 may or may not rotate, depending upon whether one or both such portions 702 and 704 are otherwise restrained from rotational movement during the initial pressurization of portion 1000B of fluid passageway 1000. In any event, initial pressurization of portion 1000B will operate, in substantially the same fashion as initial pressurization of portion 1000A, with respect to the engagement of first housing portion 702 with second housing portion 704.

While the immediately preceding discussion is concerned with a specific type of fluid system component, that is, a dry break valve, embodiments of the invention are directed, more generally, to any fluid system component having portions, or elements, which are desired to be releasably engaged. One exemplary embodiment of such a fluid system component is considered below.

Figure 10:
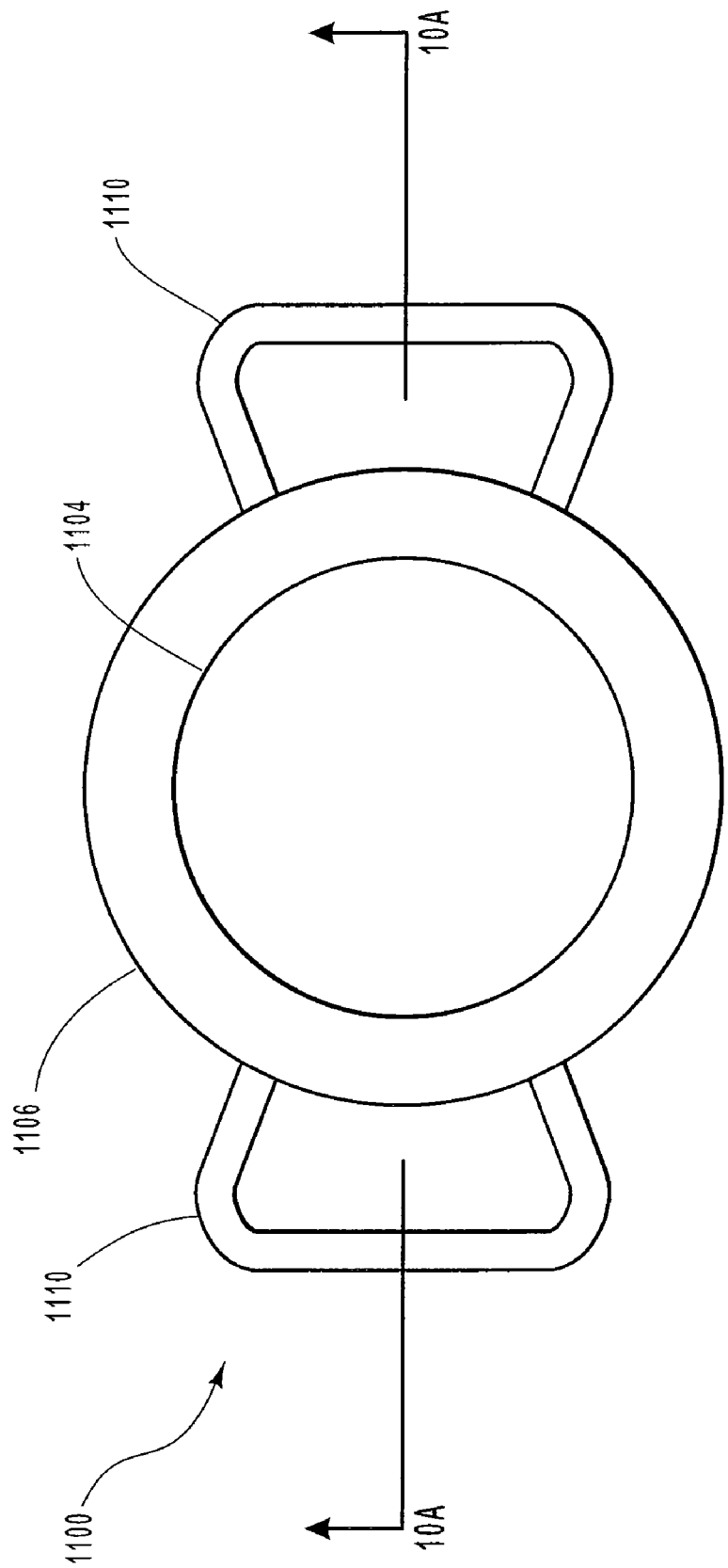
FIG. 10 is a top view of an exemplary embodiment of a fluid system component, specifically, a cap assembly, that includes elements configured to be releasably engaged with each other.

Directing attention now to FIGS. 10 through 10B, details are provided concerning an exemplary embodiment of a cap assembly, generally denoted at 1100. In the illustrated embodiment, cap assembly 1100 generally includes a sleeve 1102, configured to receive the end of a fluid conduit 1200, a cap 1104 configured to be positioned on the end of fluid conduit 1200 and cooperating with fluid conduit 1200 to at least partially define a fluid passageway 1300 when so positioned, and a collar 1106 generally configured to retain cap 1104 in position.

More particularly, sleeve 1102 defines a socket 1102A having an inside diameter of dimension ID compatible with the outside diameter dimension OD of fluid conduit 1200. It is desirable in some cases to construct sleeve 1102 in such a way that a gap is introduced between the inside of socket 1102A and fluid conduit 1200 so as to accommodate, for example, any differences in the thermal expansion rates of sleeve 1102 and fluid conduit 1200. The sleeve 1102 may be attached to fluid conduit 1200 in any suitable manner, such as by methods including, but not limited to, welding, brazing and soldering. In at least one embodiment, sleeve 1102 and fluid conduit 1200 each include mating threads so that sleeve 1102 can be removably attached to fluid conduit 1200.

Generally, sleeve 1102 comprises a metallic material that, in at least some instances, is chemically and thermally compatible with fluid conduit 1200. Exemplary materials for sleeve 1102 include, but are not limited to, copper and its alloys, steels, iron, aluminum and its alloys, and titanium and its alloys. Moreover, sleeve 102 may be machined or cast. Other suitable construction methods may alternatively be employed.

With continuing reference to its various geometric features, sleeve 1102 further includes a substantially annular chamfer 1102B that defines an opening wherein a portion of cap 1104 is received, as indicated in FIG. 10A. Generally, the geometry of chamfer 1102B is configured to correspond to the structure of cap 1104 with which it interfaces. Geometric aspects of chamfer 1102B such as, but not limited to, the wall thickness and chamfer angle may be adjusted as necessary to suit the requirements of a particular application.

As further indicated in FIG. 10A, sleeve 1102 defines a plurality of grooves 1102C that are configured and arranged to engage corresponding structure of coupling 1106, discussed in further detail below. In particular, and directing attention now to FIG. 110B as well, each groove 1102C includes three connected segments, an entry segment 1102D, an intermediate segment 1102E, and a terminal segment 1102F. Such grooves may be (a z machined, or otherwise formed, in the outer surface of sleeve 1102 and, in one embodiment, each describes an arc $\beta$ of about one hundred twenty (120) degrees about the circumference of sleeve 1102. In the case of other exemplary embodiments, such as that illustrated in FIG. 12 for example, arc $\beta$ described by each groove may be such that the grooves overlap each other. Similar to other exemplary embodiments of grooves disclosed herein, intermediate segment 1102E and terminal segment 1102F cooperate to define an offset angle $\delta$ that aids in the engagement of collar 1106 with sleeve 1102 generally in the manner described elsewhere herein.

It should be noted that the embodiment of grooves 1102C illustrated in FIG. 10B is exemplary only and aspects of grooves 1102C such as, but not limited to, the size, number, geometry, arrangement, arc length $\beta$, offset angle $\delta$, and disposition of one or more of grooves 1102C may be varied in accordance with the requirements of a particular application. Accordingly, such exemplary embodiment should not be construed to limit the scope of the invention in any way.

In correspondence with the grooves 1102C defined by sleeve 1102, collar 1106 includes a plurality of rollers 1106A, each of which is configured and arranged to be received within a corresponding groove 1102C and to travel thereal-ong, as suggested by the exemplary roller travel paths illustrated in FIG. 10B. To that end, each roller 1106A has a diameter and thickness that generally correspond with the width and depth, respectively, of a corresponding groove 1102C. As indicated in FIG. 10A, the rollers 1106A are disposed within the interior of collar 1106 and are each attached to a corresponding fastener 1106B that passes through collar 1106. Each of the fasteners 1106B is secured in position by a corresponding nut 1106C, and the extent to which rollers 1106A protrude into the interior of collar 1106 may be changed by adjusting the positioning of nuts 1106C accordingly. In some embodiments of the invention, bearings or similar structures or devices are provided to facilitate ready and reliable rotation of the rollers 1106A.

With continuing attention to FIG. 10A, further details are provided concerning aspects of collar 1106. In particular, collar 1106 defines a sealing surface 1106D that cooperates with O-ring 1108 to substantially prevent fluid leakage from the joint cooperatively defined by cap 1104 and collar 1106, as well as from the joint cooperatively defined by cap 1104 and sleeve 1102. As suggested by the foregoing, and as illustrated in FIG. 10A, the exemplary embodiment of collar 1106 is substantially hollow and is configured to receive cap 1104 in such a way as to substantially prevent material axial or radial movement of cap 1104 when collar 1106 has fully engaged sleeve 1102, as shown in FIG. 10A.

In the illustrated embodiment, cap 1104 and collar 1106 comprise discrete structures. However, in an alternative embodiment, cap 1104 and collar 1106 are integral with each other, or otherwise permanently joined to each other, and an O-ring or other sealing device is interposed between cap 1104 and sleeve 1102. The foregoing arrangements are exemplary only however, and are not intended to limit the scope of the invention.

Figure 11C:
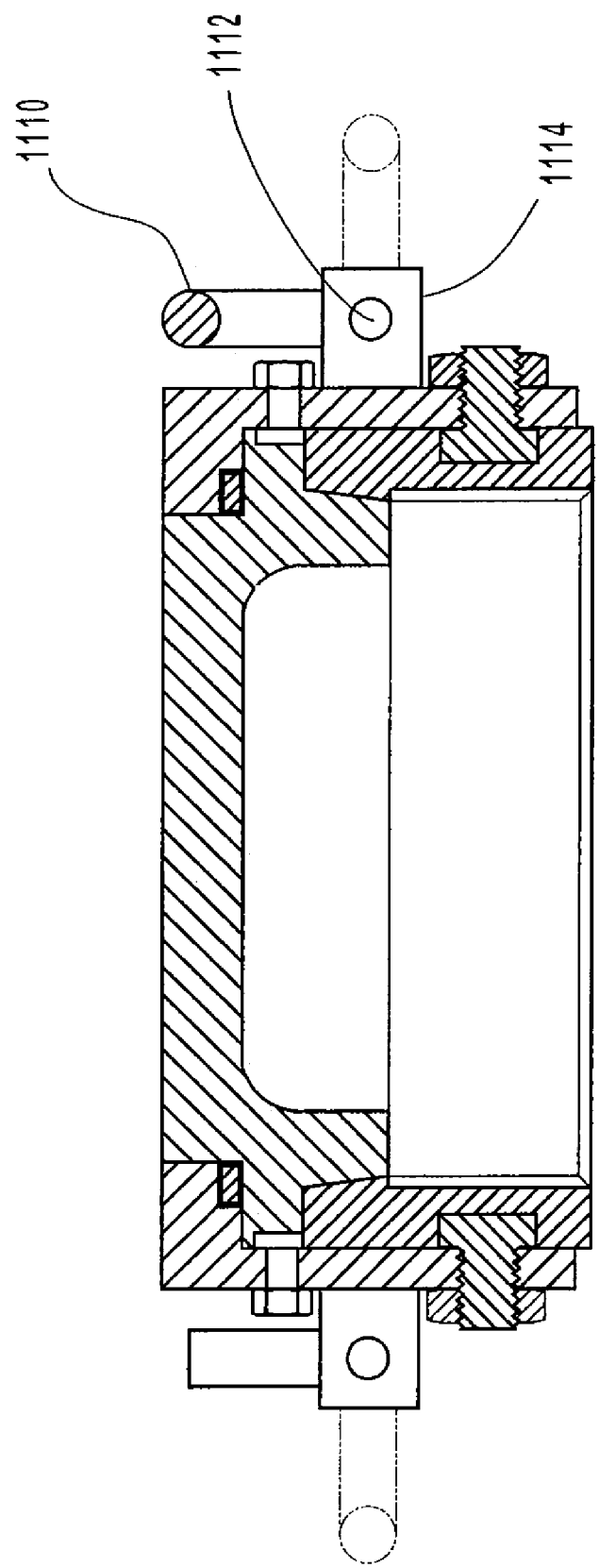
FIG. 11A is a top view of the exemplary cap assembly illustrated in FIGS. 10 through 10B, showing the position of various components prior to engagement of the sleeve and collar.
FIG. 11B is a top view of the exemplary cap assembly illustrated in FIGS. 10 through 10B, showing the position of various components after engagement of the sleeve and collar.

With continuing reference to FIGS. 10 through 10B, and directing attention now to FIGS. 11A through 11C, cap assembly 1100 further includes one or more handles 1110 that permit a user to impart a rotary motion so as to engage (FIG. 11B), or disengage (FIG. 11A), collar 1106 and sleeve 1102. The handles 1106E may comprise steel bar stock or any other suitable materials and/or configurations. In at least one embodiment, aspects of which are illustrated in FIG. 11C, each of handles 1110 are rotatably attached, by way of pins 1112, to corresponding blocks 1114 joined to collar 1106 so that handles 1110 can be rotated, as indicated, from a use position upward into a storage position when not needed, and vice versa. Moreover, some embodiments include one or more stops 1115 which serve to prevent over-rotation of collar 1106. In the embodiment illustrated in FIG. 10A, stops 1115 comprise bolts that pass through collar 1106. However, any other suitable arrangement or structure providing similar functionality may alternatively be employed.

As further indicated in FIGS. 10A, 11A and 11B, cap assembly 1100 further includes an alignment tab 1116, which is attached to sleeve 1102 and/or fluid conduit 1200, or otherwise suitably located. In the illustrated embodiment, alignment tab 1116 defines an opening 1116A positioned to be aligned with a corresponding opening 1106B1 defined by one of the fasteners 1106. At such time as an opening 1106B1 is substantially aligned with opening 1116A in a way that corresponds to a desired position of handles 1110, a tamper-evident device 1118 comprising, for example, a thin wire 1118A that can be threaded through the aligned holes and securely fastened with a lead seal 1118B so that an observer can readily determine if the position of handles 1110 has been changed subsequent to placement of the tamper-evident device 1118.

Moreover, and as suggested above, alignment tab 1116 is positioned so as to provide feedback to the operator as to whether or not collar 1106 and sleeve 1102 are fully engaged with each other. In particular, and as indicated in FIG. 11A, collar 1106 is initially positioned so that a fastener 1106 is disposed on either side thereof. As collar 1106 is rotated to the fully engaged position, illustrated in FIG. 11B, the hole 1116A of alignment tab 1116 is aligned with a corresponding hole 1106B1 of a fastener 1106B. Consequently, an operator can readily make a visual determination as to whether or not collar 1106 and sleeve 1102 are fully engaged with each other.

In some embodiments, cap assembly 1100 additionally includes a safety restraint 1120 comprising a cable 1120A and cable crimps 1120B. In an exemplary embodiment, cable 1120A comprises a one eighth (0.125) inch diameter steel cable looped through at least one handle 1110 and around fluid conduit 1200, and retained in place by cable crimps 1120B, as shown in FIG. 10A. Generally, safety restraint 1120 operates as a redundant safety system that serves to prevent, or reduce, damage to personnel or surrounding equipment and systems in the event collar 1106 becomes disconnected, in an uncontrolled manner, from sleeve 1102.

With attention now to FIGS. 10 through 11C, details are provided concerning various operational aspects of the illustrated embodiment. As such operational aspects are similar in many regard to those discussed elsewhere herein with respect to various alternative embodiments, the following discussion will focus primarily on selected operational aspects of the embodiment illustrated in FIGS. 10 through 11C.

In operation, the engagement of collar 1106 and sleeve 1102 is effected by positioning each roller 1106A in a corresponding groove 1102C and causing rollers 1106A to travel along grooves 1102C according to the path denoted in FIG. 10B. More particularly, collar 1106 and sleeve 1102 are brought together until each roller 1106A of collar 1106 is positioned in the entry segment 1102D of a corresponding groove 1102C of sleeve 1102. Rotation of collar 1106 is then initiated by way of handles 1110. As a result of the angular orientation of entry segments 1102D with respect to a longitudinal axis BB defined by the cap assembly 1100, the initial rotation of collar 1106 causes collar 1106 to be drawn toward sleeve 1102, confining cap 1104 therebetween.

Continued rotation of collar 1106 causes rollers 1106A to complete their traverse of corresponding entry segments 1102D, and move into their respective intermediate segments 1102E. In at least some cases, rollers 1106A travel to the respective ends of terminal intermediate 1102E. In any event, rollers 1106A remain in intermediate segments 1102E until such time as a predetermined pressure level is attained in a fluid passageway 1300 (FIG. 10A) collectively defined by cap 1104 and fluid conduit 1200.

Subsequently, fluid is introduced into fluid passageway 1300, by way of fluid conduit 1200 (FIG. 10A) connected with cap assembly 1100, thereby pressurizing portion fluid passageway 1300. The pressure thus exerted, denoted at $P_3$ in FIG. 10A, transmits a force to cap 1104 which, in turn, transmits the force to collar 1106. Consequently, the exertion of $P_3$ in this way forces rollers 1106A, attached to collar 1106, to lock up into corresponding terminal segments 1102F of grooves 1102C and remain therein, as indicated in FIG. 10A.

In the illustrated embodiment, the forward motion of collar 1106 may, depending on the position of rollers 1106A at the time of pressurization of fluid passageway 1300, be accompanied by a rotary motion of collar 1106 as well, as rollers 1106A travel along intermediate segments 1102E and come to rest in terminal segment 1102F of groove 1102C. Generally, such rotary motion of collar 1106 is achieved in the substantially the same way as the rotary motion of first housing portion 702, discussed above.

Once rollers 1106A are seated in their corresponding terminal segments 1102F of grooves 1102C, the continuing presence of pressure $P_3$ exerts a force on cap 1104 that resists motion of rollers 1106A in the opposite direction, that is, out of their corresponding terminal segments 1102F, and thereby aids in the retention of rollers 1106A in such terminal segments. As a result, collar 1106 and sleeve 1102 of cap assembly 1100 cannot be disengaged from each other until the fluid pressure in fluid passageway 1300 has been reduced to a predetermined level or differential.

Thus, the rollers 1106A and grooves 1102C cooperate with each other, and advantageously employ the line pressure, to ensure a secure connection between collar 1106 and sleeve 1102 of cap assembly 1100 subsequent to pressurization of fluid passageway 1300. Thus, the likelihood of inadvertent, or intentional, removal of cap 1104 while a potentially dangerous level of pressure exists in fluid passageway 1300, is materially reduced.

Figure 12:
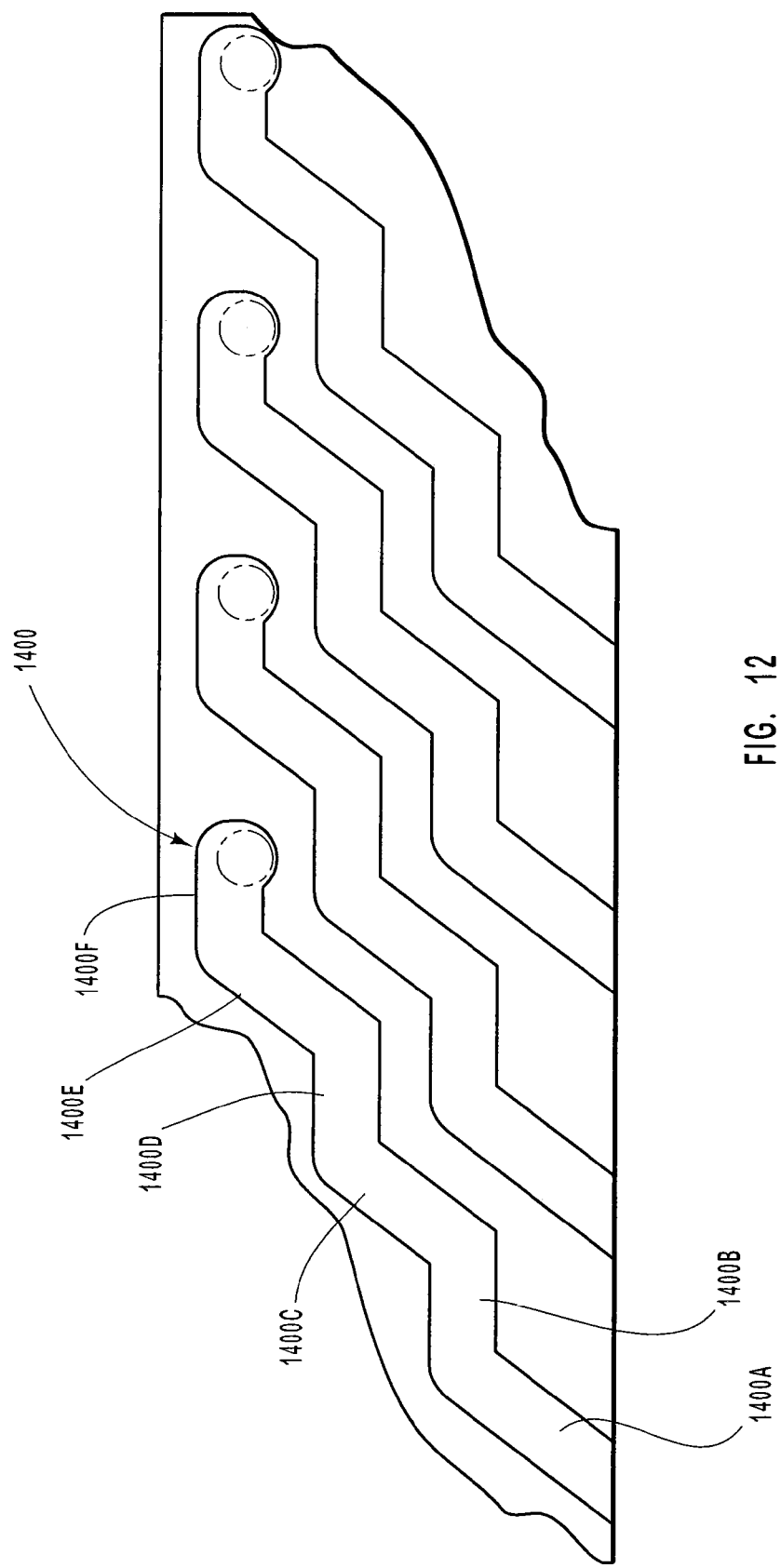
FIG. 12 is a side view illustrating various aspects of an exemplary groove configuration and arrangement that includes multiple overlapping grooves each having a plurality of intermediate segments.
Figure 6:
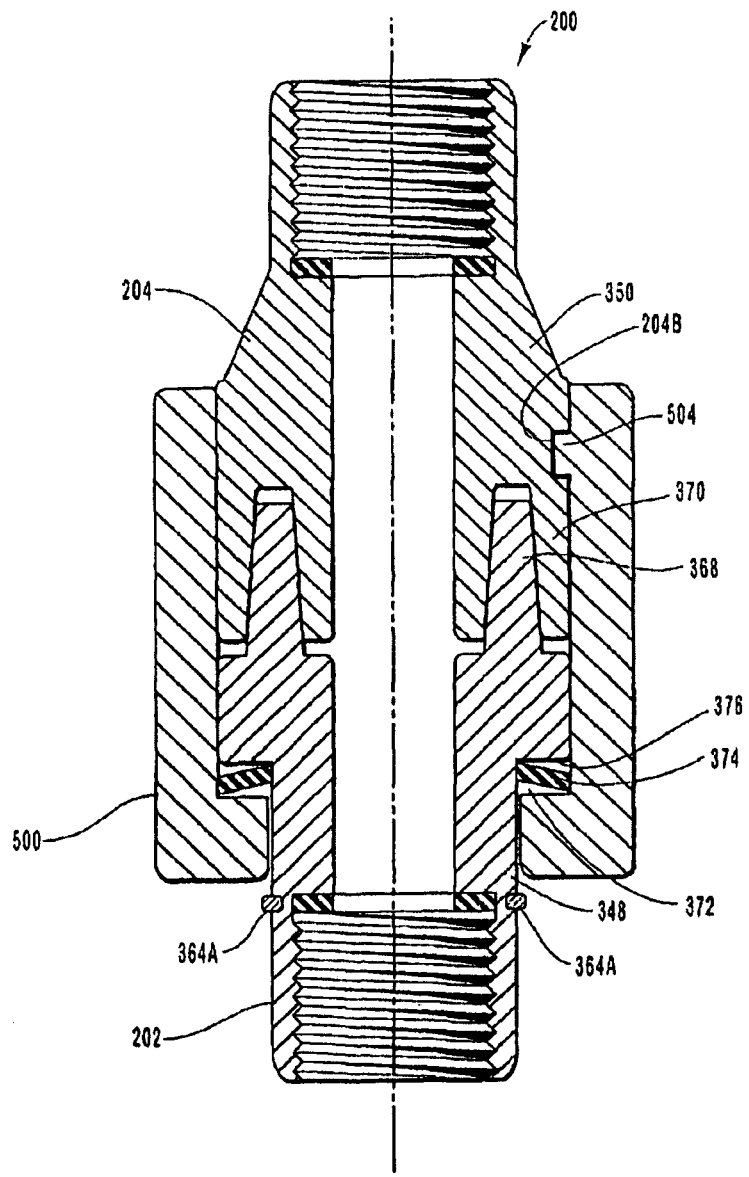
Figure 7:
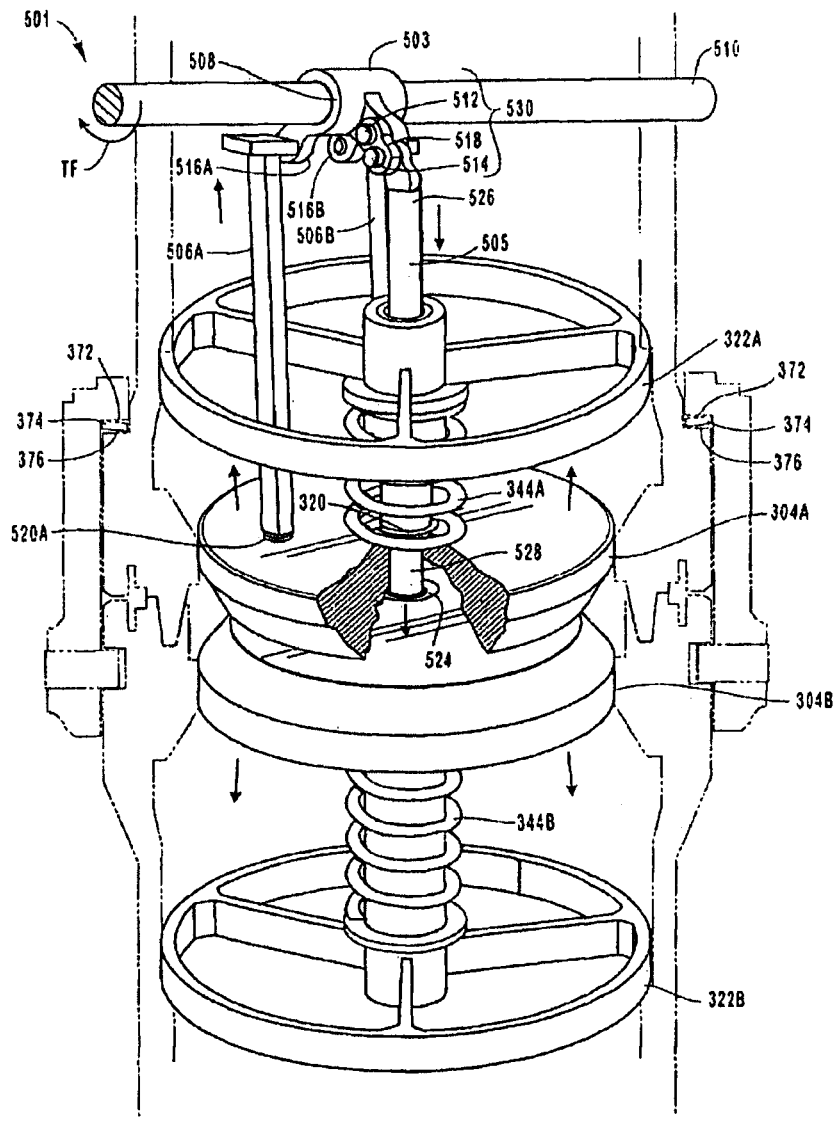
Figure 7A:
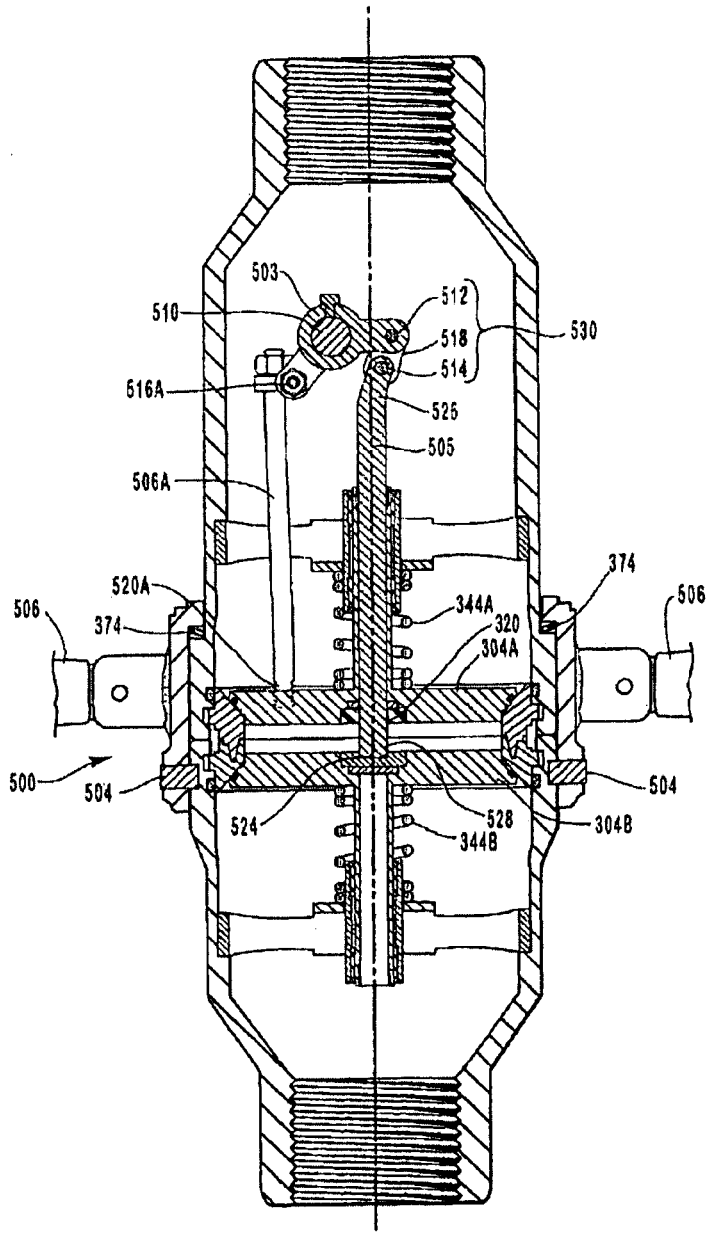
Figure 7B:
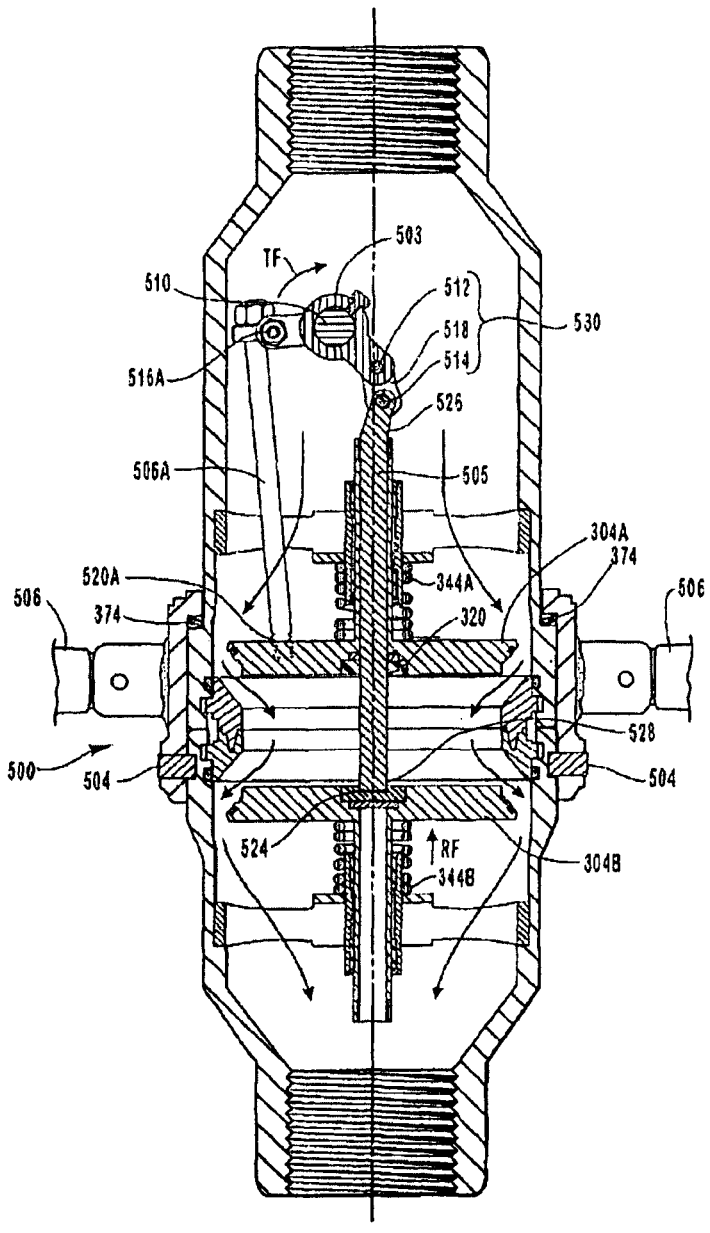

Directing attention now to FIG. 12, details are provided concerning an alternative embodiment of a groove arrangement including a plurality of grooves generally denoted at 1400. Note that in the interest of clarity, the generally cylindrical structural element wherein the grooves 1400 are formed is shown flat, rather than in a perspective view. Similar to other embodiments of grooves disclosed herein, groove 1400 includes a plurality of segments, including an entry segment 1400A. In contrast with such other embodiments however, groove 1400 further includes four intermediate segments denoted, respectively, 1400B, 1400C, 1400D and 1400E as well as a terminal segment 1400F. Moreover, in embodiments of the invention employing configurations such as grooves 1400, the final resting position of the associated rollers (not shown), that is, after the associated fluid passageway has been pressurized, is in terminal segment 1400F, rather than in one of the intermediate segments 1400B and 1400C.

Although in the exemplary embodiment illustrated in FIG. 12, grooves 1400 are illustrated that include four intermediate segments, one or more aspects of grooves 1400 may be varied as necessary to suit a particular application. For example, intermediate segments 1400B, 1400D and 1400F are, in some embodiments, generally parallel to each other. In yet other embodiments, such intermediate segments are disposed in a non-parallel arrangement. The same is likewise true with respect to segments 1400A, 1400C and 1400E. Moreover, other features such as, but not limited to, the length, width and depth of one or more grooves 1400 may be modified as required/desired.

It should thus be noted that the foregoing, and other, arrangements of grooves, as well as the type and arrangement of their associated engagement members, disclosed herein are exemplary only and are not intended to limit the scope of the invention. By way of example, in another exemplary embodiment (not shown), one or more of such grooves substantially describes a "J" shape, such that line pressure causes the corresponding engagement member to lock into a location proximate the end of the "hook" portion of the "J" shaped groove.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

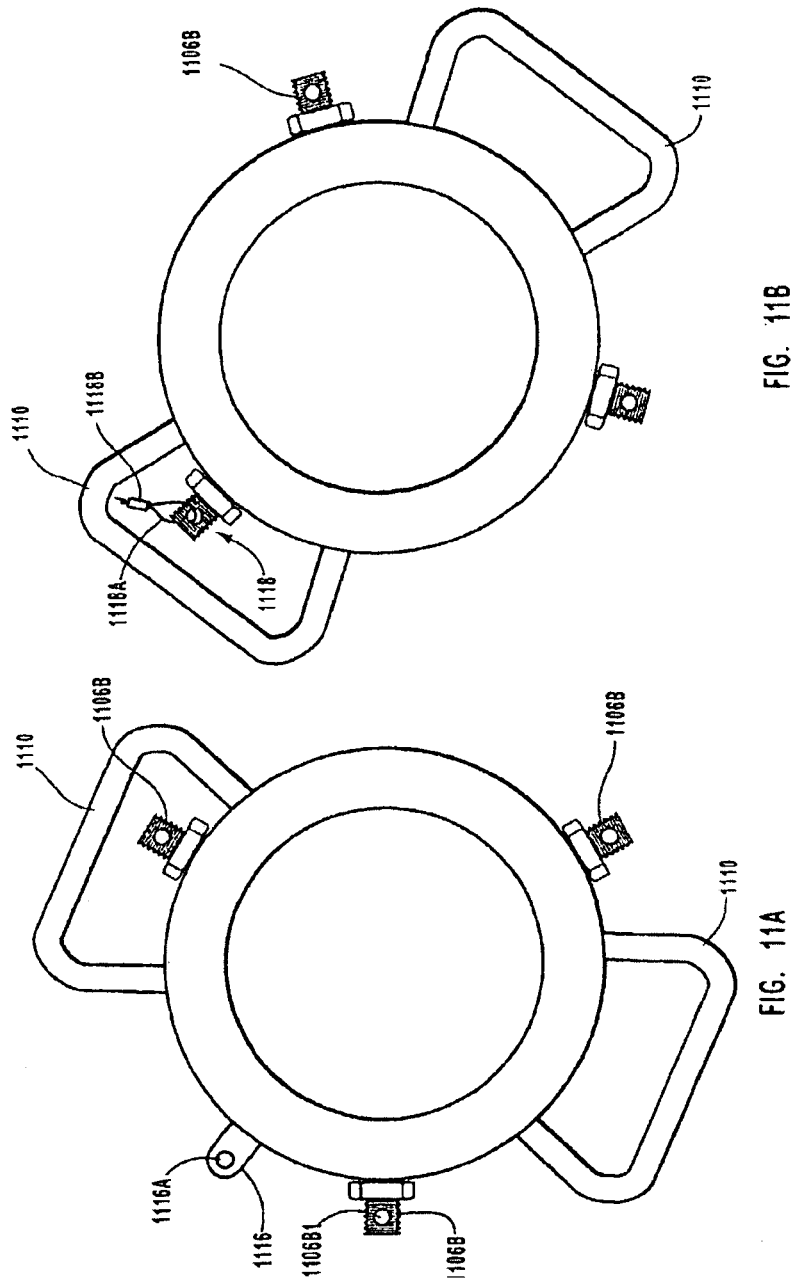

What is claimed is:

1. A dry break valve assembly, comprising:
   (a) a first housing portion;
   (b) a first flow control assembly substantially disposed within said first housing portion;
   (c) a collar attached to said first housing portion and including at least one engagement member;
   (d) a second housing portion configured to removably engage said collar, said second housing portion defining at least one groove extending at least partially about a circumference of said second housing portion, said at least one groove being configured and arranged to advance said second housing portion toward said first housing portion by and while rotating said second housing portion relative to said first housing portion and to receive said at least one engagement member and, when said first and second housing portions are engaged with each other so as to at least partially define a fluid passageway, said groove being configured and arranged so that said at least one engagement member is positioned therein so as to be acted upon, at least indirectly, by a force resulting from the presence of fluid pressure in said fluid passageway;
   (e) a second flow control assembly substantially disposed within said second housing portion; and
   (f) an actuating mechanism substantially disposed within said fluid passageway for selectively opening and closing said fluid passageway, said actuating mechanism comprising:
   a cam mechanism adapted for selective rotation to open or close said fluid passageway;
   a displacement shaft having a first end pivotally coupled to a first side of said cam mechanism and a second end coupled to said first flow control assembly; and
   a drive shaft having a first end pivotally coupled to a second side of said cam mechanism and a second end adapted to engage said second flow control assembly.

2. The dry break valve assembly as recited in claim 1, wherein said first and second flow control assemblies are operably connected with each other when said first and second housing portions are engaged with each other.

3. The dry break valve assembly as recited in claim 1, wherein said actuating mechanism further comprises
   an actuating lever operably connected with said cam mechanism to facilitate selective rotation of said cam mechanism.

4. The dry break valve assembly as recited in claim 1, wherein said actuating mechanism is substantially disposed within said first housing portion.

5. The dry break valve assembly as recited in claim 1, wherein when said fluid pressure reaches a predetermined value, said at least one engagement member is positioned in a terminal segment of said at least one groove.

6. The dry break valve assembly as recited in claim 1, wherein said at least one groove has length forming an arc of about one hundred twenty degrees.

7. The dry break valve assembly as recited in claim 1, wherein said at least one engagement member comprises a pin.

8. The dry break valve assembly as recited in claim 1, wherein said at least one engagement member comprises three pins disposed in a spaced-apart arrangement about a circumference of said collar, and wherein said at least one groove comprises three grooves.

9. The dry break valve assembly as recited in claim 1, wherein said at least one groove is substantially in the shape of a "J."

10. The dry break valve assembly as recited in claim 1, wherein said at least one groove has a substantially constant width, wherein said at least one groove comprises a plurality of segments each having said substantially constant width.

11. A coupling for use in a pressurized fluid system, comprising:
   (a) a first coupling element having at least one roller on an internal surface thereof;
   (b) a second coupling element having:
      (i) an open first end, wherein said open first end is adapted to be received within said first coupling element;
      (ii) a groove formed in an external surface of said second coupling element and extending from said open first end along a length of said second coupling element, said groove having a length substantially greater than its width, said length of said groove extending at least partially around a circumferential surface of said second coupling element in a manner such that when said roller of said first coupling member is introduced into said groove at said open first end of said second coupling element, movement of said roller along said length of said groove, and thus closer engagement of said first coupling element to said second coupling element, requires rotation of said first coupling element relative to said second coupling element, and said groove having a substantially constant width, wherein said groove comprises a plurality of segments each having said substantially constant width; and
   (c) an actuating mechanism substantially disposed within a fluid passageway formed by said first and second coupling elements for selectively opening and closing said fluid passageway, said actuating mechanism comprising:
      a cam mechanism adapted for selective rotation to open or close said fluid passageway;
      a displacement shaft having a first end pivotally coupled to a first side of said cam mechanism and a second end coupled to a first flow control assembly; and
      a drive shaft having a first end pivotally coupled to a second side of said cam mechanism and a second end adapted to engage a second flow control assembly.

12. The coupling as recited in claim 11, further comprising a valve assembly disposed within at least one of said first coupling element and said second coupling element.

13. The coupling as recited in claim 11, wherein said second coupling element has an end surface at said first open end, and wherein said groove starts at said end surface and extends at least partially around said circumferential surface of said second housing portion at an acute angle from said end surface.

14. The coupling as recited in claim 13, wherein said groove includes:
   (a) an entry segment starting at said end segment, said entry segment extending at an acute angle from said end surface;
   (b) an intermediate segment disposed at an interior end of the entry segment; and
   (c) a terminal segment offset from said intermediate segment at an acute angle.

15. The coupling as recited in claim 14, wherein said coupling is configured such that when line pressure is present in a fluid passageway defined by said first and second coupling elements, said line pressure forces said engagement member from said intermediate segment into said terminal segment, thereby causing said first coupling element to rotate relative to said second coupling element and to lock said roller within said terminal segment while said line pressure is present.

16. The coupling as recited in claim 14, wherein said groove has a substantially constant width, and wherein each of said entry segment, intermediate segment, and said terminal segment are substantially linear and have said substantially constant width.

* * * * *

UNITED STATES PATENT AND TRADEMARK OFFICE
CERTIFICATE OF CORRECTION

PATENT NO. : 7,533,694 B2
APPLICATION NO. : 11/465384
DATED : May 19, 2009
INVENTOR(S) : Lee A. Krywitsky It is certified that error appears in the above-identified patent and that said Letters Patent is hereby corrected as shown below:

The title page should be deleted and substitute therefor the attached title page as shown on the attached page.

Title Page
Item 56, References Cited, U.S. Patent Documents, change "3,542,047  A  11/1970  Nelson" to --3,542,047  A  10/1970  Nelson--
Item 56, References Cited, U.S. Patent Documents, change "4,625,746  A  12/1986  Calvin et al." to "4,626,746  A  12/1986  Calvin et al."

Drawings
Delete Figs. 6, 7, 7A, 7B, 11A and 11B and substitute therefore Figs. 6, 7, 7A, 7B, 11A and 11B as shown on the attached pages.

Column 7
Line 11, change "In addition" to --In addition,--
Line 56, change "structure" to --structures--

Column 9
Line 3, change "204" to --202--
Line 3, change "206" to --204--
Line 64, change "member" to --members--

Column 12
Line 53, add --(not shown)-- after "520B"

Column 13
Line 7, remove [(not shown)]

Column 14
Line 44, add --.-- after "700"

Signed and Sealed this

Third Day of August, 2010

David J. Kappos
*Director of the United States Patent and Trademark Office*

Column 15
Lines 10 and 11, change "In correspondence with pins 804, second housing portion 704 includes three grooves 708," to --With reference to FIG. 8A and continuing attention to FIG. 8, second housing portion 704 includes three grooves 708 in correspondence with pins 804,--

Column 16
Line 11, remove [in FIG. 10]
Line 65, add --(FIG. 10A)-- after "1106A"
Line 65, add --(FIG. 10B)-- after "1102C"

Column 17
Line 9, add --as displayed in FIGS. 9-10A-- after "1100"

Column 18
Line 23, change "102" to --1102--
Line 39, change "110B" to --10B--

Column 19
Line 38, change "1106E" to --1110--
Line 57, change "1106" to --1106B--

Column 20
Line 3, change "1106" to --1106B--
Line 45, change "terminal intermediate" to --intermediate segments--
Line 58, change "FIG. 10A" to --FIG. 10B--

CERTIFICATE OF CORRECTION (continued)

(12) United States Patent
Krywitsky

(10) Patent No.: US 7,533,694 B2
(45) Date of Patent: May 19, 2009

(54) DRY BREAK VALVE ASSEMBLY

(75) Inventor: Lee A. Krywitsky, Calgary (CA)

(73) Assignee: Hiltap Fittings, Ltd., Calgary, Alberta (CA)

(*) Notice: Subject to any disclaimer, the term of this patent is extended or adjusted under 35 U.S.C. 154(b) by 0 days.

(21) Appl. No.: 11/465,384

(22) Filed: Aug. 17, 2006

(65) Prior Publication Data
US 2006/0289062 A1    Dec. 28, 2006

Related U.S. Application Data

(60) Division of application No. 10/164,945, filed on Jun. 7, 2002, now Pat. No. 7,152,630, which is a continuation-in-part of application No. 09/628,075, filed on Jul. 28, 2000, now Pat. No. 6,672,327.

(51) Int. Cl.
*F16L 37/36* (2006.01)
(52) U.S. Cl. ............ 137/614.06; 251/89.5; 251/149.9
(58) Field of Classification Search ............ 137/614.06; 251/89.5, 149.9; 285/361
See application file for complete search history.

(56) References Cited

U.S. PATENT DOCUMENTS

| | | | |
|---|---|---|---|
| 179,947 A | 7/1876 | O'Neil | |
| 923,545 A | 6/1909 | Madison | |
| 1,021,203 A | 3/1912 | Matchette | |
| 2,333,496 A | 11/1943 | Townhill et al. | |
| 2,340,965 A | 2/1944 | Kiesel | |
| 2,543,590 A * | 2/1951 | Swank | 137/614.06 |
| 2,571,236 A | 10/1951 | Hamilton | |
| 2,679,407 A | 5/1954 | Badger | |
| 2,707,390 A | 5/1955 | Beretish | |
| 2,737,401 A * | 3/1956 | Lindsay | 137/614.06 |
| 3,454,024 A | 7/1969 | McCullough | |
| 3,474,827 A * | 10/1969 | Rosell | 137/614.06 |
| 3,542,047 A | 11/1970 | Nelson | |
| 3,664,634 A | 5/1972 | Guertin et al. | |
| 3,821,970 A | 7/1974 | Affa | |
| 3,949,787 A | 4/1976 | Milo | |
| 4,010,633 A | 3/1977 | Hasha | |
| 4,019,371 A | 4/1977 | Chaplin et al. | |
| 4,133,347 A | 1/1979 | Mercer | |
| 4,184,516 A | 1/1980 | Oesterritter et al. | |
| 4,269,230 A | 5/1981 | Pepper | |
| 4,271,865 A | 6/1981 | Galloway et al. | |

(Continued)

OTHER PUBLICATIONS

OEM Mass Flowmeters, TSI Incorporated, 1998.

(Continued)

*Primary Examiner*—John Rivell
(74) *Attorney, Agent, or Firm*—Workman Nydegger

(57) ABSTRACT

A fluid system component is provided that includes first and second elements configured to be removably engaged with each other and defining a fluid passageway when engaged. The first element defines three grooves, each of which includes a terminal portion. Correspondingly, the second element includes three engagement members each of which is configured and arranged to be received in, and travel along, a corresponding groove. The presence of a predetermined line pressure in the fluid passageway forces each engagement member into the terminal portion of the corresponding groove, so as to substantially foreclose disengagement of the first and second elements until the fluid pressure in the fluid passageway has reached a predetermined magnitude.

16 Claims, 17 Drawing Sheets

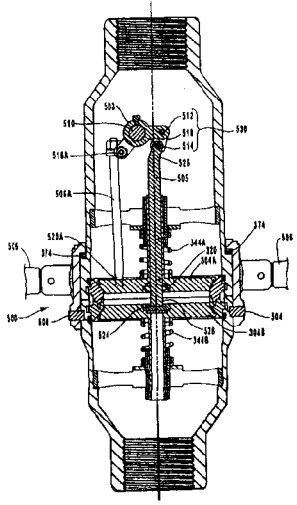

Sheet 6, replace FIG. 6 with the figure depicted below, wherein dry valve assembly 200, fitting member 348, and coupler 500 are labeled Sheet 7, replace FIG. 7 with the figure depicted below, wherein bore 320 and actuating lever 508 are shown Sheet 8, replace FIG. 7A with the figure depicted below, wherein bore 320 and groove 524 are labeled Sheet 9, replace FIG. 7B with the figure depicted below, wherein bore 320 and groove 524 are labeled

CERTIFICATE OF CORRECTION (continued)
U.S. Pat. No. 7,533,694 B2

Sheet 15, replace FIGS. 11A and 11B with the figures depicted below, wherein fastener 1116B is relabeled 1106B